United States Patent
Mezghani et al.

(10) Patent No.: US 10,539,324 B2
(45) Date of Patent: Jan. 21, 2020

(54) SYSTEM FOR COMBUSTING A METHANE STREAM AND A METHOD OF COMBUSTION

(71) Applicant: KING FAHD UNIVERSITY OF PETROLEUM AND MINERALS, Dhahran (SA)

(72) Inventors: Khaled Mezghani, Dhahran (SA); Amir Hamza, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 679 days.

(21) Appl. No.: 15/332,632

(22) Filed: Oct. 24, 2016

(65) Prior Publication Data

US 2017/0356647 A1    Dec. 14, 2017

Related U.S. Application Data

(60) Provisional application No. 62/347,926, filed on Jun. 9, 2016.

(51) Int. Cl.
*F23L 7/00* (2006.01)
*F23D 14/32* (2006.01)
*F23D 14/22* (2006.01)

(52) U.S. Cl.
CPC .............. *F23L 7/007* (2013.01); *F23D 14/22* (2013.01); *F23D 14/32* (2013.01); *F23D 2203/10* (2013.01); *Y02E 20/344* (2013.01)

(58) Field of Classification Search
CPC ...... Y02E 20/344; Y02E 20/185; F23L 7/007; F23D 14/32; Y10S 502/525
See application file for complete search history.

(56) References Cited

U.S. PATENT DOCUMENTS 5,573,737 A * 11/1996 Balachandran ........ B01J 12/007
                                                                  422/211
5,681,373 A * 10/1997 Taylor .................. B01D 53/228
                                                                  96/11

(Continued)

FOREIGN PATENT DOCUMENTS

EP    1 547 972 A2    6/2005
EP    2 374 526 A1    10/2011

OTHER PUBLICATIONS

Z. Chen, et al., "Assessment of Ba0.5Sr0.5Co1-yFeyO3-δ (y=0.0-1.0) for prospective application as cathode for IT-SOFCs or oxygen permeating membrane" http://www.sciencedirect.com/science/article/pii/S0013468607007815, vol. 52, Issue 25, Sep. 2007, pp. 7343-7351.

(Continued)

*Primary Examiner* — Jorge A Pereiro
(74) *Attorney, Agent, or Firm* — Oblon, McClelland, Maier & Neustadt, L.L.P.

(57) ABSTRACT

A system for combusting a methane stream in an ITM combustion reactor and a method of combusting the methane stream, wherein an optimized volumetric flow rate of the methane stream provides an off-stoichiometric molar ratio of methane to oxygen, which is provided by an ITM in the ITM combustion reactor, and the method further offers a relatively constant oxygen flux via the ITM as well as a prolonged membrane stability. Various embodiments of the system and the method are also provided.

14 Claims, 17 Drawing Sheets

(56) References Cited

U.S. PATENT DOCUMENTS

| | | | | |
|---|---|---|---|---|
| 5,846,641 | A * | 12/1998 | Abeles | B01D 53/228 |
| | | | | 428/312.8 |
| 6,117,808 | A * | 9/2000 | Maiya | B01D 71/022 |
| | | | | 48/198.7 |
| 6,153,163 | A * | 11/2000 | Prasad | B01J 19/2475 |
| | | | | 423/246 |
| 6,331,283 | B1 * | 12/2001 | Roy | B01J 8/0055 |
| | | | | 423/648.1 |
| 7,338,549 | B2 * | 3/2008 | Bulow | C01B 3/382 |
| | | | | 502/525 |
| 7,347,887 | B2 * | 3/2008 | Bulow | C01B 3/382 |
| | | | | 502/525 |
| 7,893,002 | B2 | 2/2011 | Farrusseng et al. | |
| 8,590,490 | B2 * | 11/2013 | Habib | F22B 1/18 |
| | | | | 122/149 |
| 2002/0179887 | A1 * | 12/2002 | Zeng | B01D 53/02 |
| | | | | 252/373 |
| 2004/0101472 | A1 * | 5/2004 | Kurimura | B01J 23/8946 |
| | | | | 423/650 |
| 2005/0061663 | A1 * | 3/2005 | Chen | B01D 53/228 |
| | | | | 204/295 |
| 2007/0134604 | A1 * | 6/2007 | Sirman | C01B 13/0251 |
| | | | | 431/2 |
| 2007/0275292 | A1 * | 11/2007 | Sin Xicola | B82Y 30/00 |
| | | | | 429/423 |
| 2009/0277328 | A1 * | 11/2009 | Wijmans | B01D 53/22 |
| | | | | 95/51 |
| 2010/0178238 | A1 * | 7/2010 | Takamura | B01D 53/22 |
| | | | | 423/648.1 |
| 2011/0183221 | A1 * | 7/2011 | Serra Alfaro | C01B 13/0255 |
| | | | | 429/416 |
| 2011/0263912 | A1 * | 10/2011 | Miller | B01D 53/228 |
| | | | | 568/959 |
| 2015/0226118 | A1 * | 8/2015 | Kelly | F02C 3/22 |
| | | | | 290/52 |

OTHER PUBLICATIONS

P. Zeng, et al., "Reevaluation of Ba 0.5Sr 0.5Co 0.8Fe 0.2O 3-δ perovskite as oxygen semi-permeable membrane" https://www.researchgate.net/publication/244275410, vol. 291, Issue. 1, Mar. 2007, pp. 148-156.

S. Liu, et al., "Ba0.5Sr0.5Co0.8Fe0.2O3-δ ceramic hollow-fiber membranes for oxygen permeation" http://onlinelibrary.wiley.com/doi/10.1002/aic.10966/abstract, vol. 52, Issue. 10, Aug. 21, 2006, pp. 3452-3461.

L. Olivier, et al., "Oxidative coupling of methane using catalyst modified dense perovskite membrane reactors" http://www.sciencedirect.com/science/article/pii/S0920586109000273, vol. 142, Issues 1-2, Apr. 2009, pp. 34-41.

K. Mezghani, et al., "Application ofBa.0.5Sr0.5Co0.5Fe0.2O3_δ membranesinanoxy-fuel combustion reactor" Journal of Membrane Science 518, 2016, pp. 254-262.

\* cited by examiner

SYSTEM FOR COMBUSTING A METHANE STREAM AND A METHOD OF COMBUSTION

CROSS REFERENCE TO RELATED APPLICATIONS

This application claims the benefit of U.S. Provisional Application No. 62/347,926 filed Jun. 9, 2016.

BACKGROUND OF THE INVENTION

Technical Field

The present invention relates to a system for combusting a methane stream in an ITM combustion reactor, and a method of combusting with a preferred volumetric flow rate of the methane stream that provides a relatively constant oxygen flux via the membrane and a prolonged membrane stability.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Global warming is one of the major concerns in environmental management and protection [L. Sun and M. Wang, "Global Warming and Global Dioxide Emission: An Empirical Study," *J. Environ. Manage.*, vol. 46, no. 4, pp. 327-343, 1996]. The emission of Slimane, A. E. Bland, and I. Wright, "Progress in carbon dioxide separation and capture: A review," *J. Environ. Sci.*, vol. 20, pp. 14-27, 2008]. There are three possible technical solutions for $CO_2$ capture in fossil-fuel power plants: post-combustion, pre-combustion, and oxy-fuel combustion [H. Herzog and D. a N. Golomb, "Carbon Capture and Storage from Fossil Fuels and Biomass," *Clim. Change*, vol. 379, no. 6562, pp. 240-79, 2006; M. A. Habib, H. M. Badr, S. F. Ahmed, R. Ben-Mansour, K. Mezghani, S. Imashuku, G. J. la O', Y. Shao-Horn, N. D. Mancini, A. Mitsos, P. Kirchen, and A. F. Ghoneim, "A review of recent developments in carbon capture utilizing oxy-fuel combustion in conventional and oxygen transport membrane systems," *Int. J. Energy Res.*, vol. 35, no. 9, pp. 741-764, 2011]. In oxy-fuel combustion, fuel is burnt in a pure oxygen atmosphere thus producing a highly concentrated $CO_2$ stream along with water vapor, which can be easily condensed. A pure oxygen environment inside the reactor can be generated by either external oxygen supply or internal oxygen extraction using ion transport membranes (ITMs). It has been shown [M. den Exter, J. F. Vente, D. Jansen, and W. G. Haije, "Viability of mixed conducting membranes for oxygen production and oxyfuel processes in power production," *Energy Procedia*, vol. 1, no. 1, pp. 455-459, 2009; K. Foy, "Investigation into the possible use of an oxygen transport membrane combustion unit in an oxyfired power plant," Dublin Institute of Technology, 2007] that ITMs are excellent candidates for oxy-fuel combustion due to a relatively low energy consumption and also an easy installation inside membrane reactors. Dense solid (non-porous) ceramic membranes that exhibit high ionic and electronic conductivity are great ITM candidates that can be used for producing pure oxygen from air or other oxygen-containing streams. Oxygen production using ITMs is economical, clean, and efficient.

An ion transport membrane (ITM) is a crystalline ceramic membrane which contains oxide ion vacancies. When an ITM is activated by heat, oxide ions travel through the membrane via the vacancies. Mixed conducting perovskite-type oxides represent one of the most promising materials for this purpose [H. J. M. Bouwmeester and A. J. Burggraaf, "Dense ceramic membranes for oxygen separation," in *Fundamentals of Inorganic Membrane Science and Technology*, A. J. Burggraaf and L. Cot, Eds. Elsevier, 1996, pp. 435-527]. When the A-site of perovskite is doped with lower valence state metal ions, oxygen vacancies as well as a change in the valence state of the B ions in the lattice will occur in order to maintain the electrical neutrality [Z. Shao, G. Xiong, H. Dong, W. Yang, and L. Lin, "Synthesis, oxygen permeation study and membrane dense ceramic reactor for partial oxidation of methane to syngas," vol. 25, pp. 97-116, 2001]. Some of the perovskites represent considerably high oxide ionic conductivities at elevated temperatures and a relatively large permeation flux was observed for such materials.

Since Teraoka et al. [Y. Teraoka, H. M. Zhang, K. Okamoto, and N. Yamazoe, "Mixed ionic-electronic conductivity of $La_{1-x}Sr_xCo_{1-y}Fe_yO_{3-\delta}$ perovskite-type oxides," *Materials Research Bulletin*, vol. 23, no. 1. pp. 51-58, 1988] first reported the remarkable high oxygen permeation flux through the ceramic disks based on the $La_{1-x}Sr_x Co_{1-y}Fe_yO_{3-\delta}$ (LSCF) perovskite oxides in the 1980s, cobalt-containing perovskite membranes have been widely investigated. Although the cobalt-based materials are generally recognized to have low chemical stability, long-term operation stability of such membrane reactors have been reported in the literature illustrating that cobalt based mixed conducting membranes are able to operate stably under the stringent partial oxidation condition [H. J. M. Bouwmeester and A. J. Burggraaf, "Dense ceramic membranes for oxygen separation," in *Fundamentals of Inorganic Membrane Science and Technology*, A. J. Burggraaf and L. Cot, Eds. Elsevier, 1996, pp. 435-527; Z. Shao, G. Xiong, H. Dong, W. Yang, and L. Lin, "Synthesis, oxygen permeation study and membrane dense ceramic reactor for partial oxidation of methane to syngas," vol. 25, pp. 97-116, 2001]. Among the various cobalt-based oxygen separation membrane compositions, $Ba_{0.5}Sr_{0.5}Co_{0.8}Fe_{0.2}O_{3-\delta}$ (BSCF) have attracted much interest due to its high oxygen permeability [Z. Shao, G. Xiong, H. Dong, W. Yang, and L. Lin, "Synthesis, oxygen permeation study and membrane dense ceramic reactor for partial oxidation of methane to syngas," vol. 25, pp. 97-116, 2001]. Many researches have been focused to develop cobalt-free perovskite materials with intrinsically improved chemical stability, such as La—Sr—Ga—Fe [T. Ishihara, T. Yamada, H. Arikawa, H. Nishiguchi, and Y. Takita, "Mixed electronic-oxide ionic conductivity and oxygen permeating property of Fe-, Co- or Ni-doped $LaGaO_3$ perovskite oxide," *Solid State Ionics*, vol. 135, no. 1-4, pp. 631-636, 2000], Be—Ce—Fe [X. Zhu, H. Wang, and W. Yang, "Novel cobalt-free oxygen permeable membrane.," *Chem. Commun. (Camb).*, no. 9, pp. 1130-1131, 2004] and Ba—Sr—Zn—Fe [H. Wang, C. Tablet, A. Feldhoff, and J. Caro, "A cobalt-free oxygen-permeable membrane based on the perovskite-type oxide $Ba_{0.5}Sr_{0.5}Zn_{0.2}Fe_{0.8}O_{3-\delta}$," *Adv. Mater.*, vol. 17, no. 14, pp. 1785-1788, 2005]. However, thus far, none of the developed materials provide an oxygen permeation flux of the cobalt-contained materials.

In a power plant environment, the flue gas stream volume consists of about 25 to 30% water vapor, 70 to 75% $CO_2$, 1-3% $O_2$, and 400 ppm $SO_2$ concentration [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011]. BSCF membranes are one of the best membrane candidates for oxygen separation in power plant reactors [M. A. Habib, H. M. Badr, S. F. Ahmed, R. Ben-Mansour, K. Mezghani, S. Imashuku, G. J. la O', Y. Shao-Horn, N. D. Mancini, A. Mitsos, P. Kirchen, and A. F. Ghoneim, "A review of recent developments in carbon capture utilizing oxy-fuel combustion in conventional and oxygen transport membrane systems," *Int. J. Energy Res.*, vol. 35, no. 9, pp. 741-764, 2011]. However, recent studies have shown that BSCF membranes are not appropriate materials for long-term service in $CO_2$-containing environments, because these membranes are highly reactive by forming $(Ba,Sr)CO_3$ compounds [M. Arnold, H. Wang, and a Feldhoff, "Influence of $CO_2$ on the oxygen permeation performance and the microstructure of perovskite-type $(Ba_{0.5}Sr_{0.5})(Co_{0.8}Fe_{0.2})O_{3-\delta}$ membranes," *J. Memb. Sci.*, vol. 293, no. 1-2, pp. 44-52, April 2007; A. Yan, B. Liu, Y. Dong, Z. Tian, D. Wang, and M. Cheng, "A temperature programmed desorption investigation on the interaction of $Ba_{0.5}Sr_{0.5}Co_{0.8}Fe_{0.2}O_{3-\delta}$ perovskite oxides with $CO_2$ in the absence and presence of $H_2O$ and $O_2$," *Appl. Catal. B Environ.*, vol. 80, no. 1-2, pp. 24-31, 2008]. These instability issues lead to severe degradation in the performance of the BSCF membranes [S. Mcintosh, J. Vente, W. Haije, D. Blank, and H. Bouwmeester, "Structure and oxygen stoichiometry of $SrCo_{0.8}Fe_{0.2}O_{3-\delta}$ and $Ba_{0.5}Sr_{0.5}Co_{0.8}Fe_{0.2}O_{3-\delta}$," *Solid State Ionics*, vol. 177, no. 19-25, pp. 1737-1742, October 2006; S. Švarcová, K. Wiik, J. Tolchard, H. J. M. Bouwmeester, and T. Grande, "Structural instability of cubic perovskite $Ba_xSr_{1-x}Co_{1-y}Fe_yO_{3-\delta}$," *Solid State Ionics*, vol. 178, no. 35-36, pp. 1787-1791, 2008].

Some other researches have been focused on the performance of the ITMs by measuring oxygen permeability while using $CO_2$ (pure or mixture) as a sweep gas [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011; M. Arnold, H. Wang, and a Feldhoff, "Influence of $CO_2$ on the oxygen permeation performance and the microstructure of perovskite-type $(Ba_{0.5}Sr_{0.5})(Co_{0.8}Fe_{0.2})O_{3-\delta}$ membranes," *J. Memb. Sci.*, vol. 293, no. 1-2, pp. 44-52, April 2007; A. V. Kovalevsky, A. A. Yaremchenko, V. A. Kolotygin, F. M. M. Snijkers, V. V. Kharton, A. Buekenhoudt, and J. J. Luyten, "Oxygen permeability and stability of asymmetric multilayer $Ba_{0.5}Sr_{0.5}Co_{0.8}Fe_{0.2}O_{3-\delta}$ ceramic membranes," *Solid State Ionics*, vol. 192, no. 1, pp. 677-681, June 2011]. Results of these researches show that as soon as the inert carrier gas is switched to $CO_2$ at the sweep side, the permeability of BSCF membranes deteriorate greatly. Other researchers have exposed the BSCF membranes to $CO_2$ rich environment and used various characterization techniques like XRD, TG/DSC, SEM/EDS etc. to determine the reason for this deterioration [A. Yan, B. Liu, Y. Dong, Z. Tian, D. Wang, and M. Cheng, "A temperature programmed desorption investigation on the interaction of $Ba_{0.5}Sr_{0.5}Co_{0.8}Fe_{0.2}O_{3-\delta}$ perovskite oxides with $CO_2$ in the absence and presence of $H_2O$ and $O_2$," *Appl. Catal. B Environ.*, vol. 80, no. 1-2, pp. 24-31, 2008; S. Švarcová, K. Wiik, J. Tolchard, H. J. M. Bouwmeester, and T. Grande, "Structural instability of cubic perovskite $Ba_xSr_{1-x}Co_{1-y}Fe_yO_{3-\delta}$," *Solid State Ionics*, vol. 178, no. 35-36, pp. 1787-1791, 2008; A. J. Ellett, *Oxygen Permeation and Thermo-Chemical Stability of Oxygen Separation Membrane Materials for the Oxyfuel Process*. Forschungszentrum Jülich, 2010]. A reaction zone was observed to be formed on the surface of BSCF membranes when annealed in $CO_2$ containing atmosphere [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011]. This layer was determined to be a mixed barium and strontium carbonate in the form of $(Ba_xSr_{1-x})CO_3$. It was found that this carbonate layer covers the entire surface of the BSCF pallets when annealed at 700° C. and 800° C., however, only few spots of the surface were covered when annealed at 600° C.

In order to solve the stability issue of the BSCF membranes, researchers have attempted to modify the membrane materials by doping or replacing the A or the B site of the perovskite structure with other elements. For example, Kim et al. [J. Kim, S. Choi, A. Jun, H. Y. Jeong, J. Shin, and G. Kim, "Chemically Stable Perovskites as Cathode Materials for Solid Oxide Fuel Cells: La-Doped $Ba_{0.5}Sr_{0.5}Co_{0.8}Fe_{0.2}O_{3-\delta}$," *Chem Sus Chem*, vol. 7, no. 6, pp. 1669-75, 2014] showed that Lanthanum doped BSCF has a higher stability under air, $CO_2$ containing atmosphere, or low oxygen atmosphere. Wang et al. [F. Wang, T. Nakamura, K. Yashiro, J. Mizusaki, and K. Amezawa, "Effect of Nb doping on the chemical stability of BSCF-based solid solutions," *Solid State Ionics*, vol. 262, no. 3, pp. 719-723, 2014] showed that the stability of BSCF membranes, when exposed to a $CO_2$ containing atmosphere, can be improved by doping Nb to the membrane. Efimov et al. [K. Efimov, T. Klande, N. Juditzki, and A. Feldhoff, "Ca-containing $CO_2$-tolerant perovskite materials for oxygen separation," *J. Memb. Sci.*, vol. 389, pp. 205-215, February 2012] considered different calcium containing perovskite materials and concluded that $La_{0.6}Ca_{0.4}Co_{0.8}Fe_{0.2}O_{3-\delta}$ (LCCF) membranes not only retained perovskite structure at high temperatures but also showed constant oxygen flux in $CO_2$ rich environment without showing any formation of carbonates. In addition, $La_{0.6}Sr_{0.4}Ti_{0.3}Fe_{0.7}O_{3-\delta}$ (LSTF) membranes were shown to have a great resistance and durability in $CO_2$ containing environment, however, oxygen flux of these membranes were found to be relatively low [J. H. Park, K. Y. Kim, and S. Do Park, "Oxygen permeation and stability of $La_{0.6}Sr_{0.4}Ti_xFe_{1-x}O_{3-\delta}$ (x=0.2 and 0.3) membrane," *Desalination*, vol. 245, no. 1-3, pp. 559-569, 2009]. A cobalt free composition $BaFe_{0.55}Nb_{0.45}O_{3-\delta}$ was also tested for oxygen permeability by Yi et al. [J. Yi, T. E. Weirich, and M. Schroeder, "$CO_2$ corrosion and recovery of perovskite-type $BaCo_{1-x-y}Fe_xNb_yO_{3-\delta}$ membranes," vol. 437, pp. 49-56, 2013] with $CO_2$ as sweep gas, and it did not show any significant degradation. Similarly, Engels et al. [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011] showed that $Sr_{0.5}Ca_{0.5}Mn_{0.8}Fe_{0.2}O_{3-\delta}$ (SCMF) membranes and $La_2NiO_{4+\delta}$ (LNO) membranes have a high chemical stability in the presence of $CO_2$, however, the membrane becomes unstable when traces of $SO_2$ is present in the sweep. All of these materials, discussed so far, have better chemical stability than BSCF but considerably low oxygen permeability. In the above reported literature, ITM stability had been evaluated in a $CO_2$ rich environment. Having the CO$_2$ rich environment is valid for a quick stability screening of an ITM; however, it overestimates the real operating conditions of oxy-fuel reactors. Therefore, some of the membranes that are relatively stable in a less harsh environment might have been ignored.

Previously investigated ITMs have been subjected to actual reaction conditions in the presence of a pure fuel-gas flow. Accordingly, oxygen separation performance of BSCF membranes have been evaluated with a real power plant reactor conditions in the presence of a methane stream. In view of the forgoing, one objective of the present invention is to provide a system for combusting a methane stream and a method of combusting with a preferred volumetric flow rate of the methane stream that provides an off-stoichiometric molar ratio of methane to oxygen, which is produced via a BSCF membrane. The method further offers a relatively constant oxygen flux via the membrane, and a prolonged membrane stability.

BRIEF SUMMARY OF THE INVENTION

The present disclosure relates to a method of combusting a methane stream with an oxygen transport membrane assembly comprising a vessel with an internal cavity having a feed side and a combustion side that are separated by an oxygen transport membrane having a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, and Ga, and wherein each of x, x', y, and y' has a value between 0 and 1, such that x+x'=1 and y+y'=1, and z is a number that varies to maintain electro-neutrality of the oxygen transport membrane. The method involves i) delivering an oxygen-containing stream to the feed side of the vessel, wherein molecular oxygen present in the oxygen-containing stream is transported to the combustion side through the oxygen transport membrane, ii) delivering a methane stream to the combustion side of the vessel, wherein methane in the methane stream is combusted with the molecular oxygen to form an exhaust stream that comprises water vapor and carbon dioxide, wherein a molar flow rate ratio of methane to the molecular oxygen is in the range of 1:2.1 to 1:3.

In one embodiment, a volumetric flow rate of the methane stream is less than 20 L/min per 1.0 m$^2$ surface area of the oxygen transport membrane.

In one embodiment, a thickness of the oxygen transport membrane is in the range of 0.5-3 mm.

In one embodiment, an oxygen flux of the oxygen transport membrane is in the range of 0.5-2.5 μmol·cm$^{-2}$·s$^{-1}$ at a temperature in the range of 600-1,200° C.

In one embodiment, the oxygen transport membrane is Ba$_{0.5}$Sr$_{0.5}$Co$_{0.8}$Fe$_{0.2}$O$_{3-z}$. According to this embodiment, a thickness of the oxygen transport membrane is in the range of 1-1.5 mm, and an oxygen flux of the oxygen transport membrane is within the range of 0.8-1.5 μmol·cm$^{-2}$·s$^{-1}$ at a temperature in the range of 800-1,000° C., for at least 200 hours.

In one embodiment, a volumetric flow rate of the methane stream is less than 10 L/min per 1.0 m$^2$ surface area of the oxygen transport membrane.

In one embodiment, no more than 0.1 vol % of carbon dioxide, nitrogen, hydrogen, water vapor, carbon monoxide, argon, helium, and/or ethane are present in the methane stream.

In one embodiment, no more than 1.0 vol % of nitrogen, hydrogen, carbon monoxide, argon, helium, methane, and/or ethane are present in the exhaust stream.

In one embodiment, the method of combusting a methane stream further involves i) cooling the exhaust stream to form a liquid phase comprising water and a gaseous phase comprising carbon dioxide, ii) separating the liquid phase from the gaseous phase, iii) injecting the gaseous phase into a geological formation.

In one embodiment, no more than 1.0 vol % of nitrogen, hydrogen, carbon monoxide, argon, helium, methane, and/or ethane are present in the exhaust stream and the method of combusting a methane stream further involves i) cooling the exhaust stream to form a liquid phase comprising water and a gaseous phase comprising carbon dioxide and no more than 1.0 vol % of nitrogen, hydrogen, carbon monoxide, argon, helium, methane, and/or ethane, ii) separating the liquid phase from the gaseous phase, iii) injecting the gaseous phase into a geological formation.

The present disclosure further relates to a system for combusting a methane stream, including an oxygen transport membrane assembly that includes i) a vessel with an internal cavity having a feed side and a combustion side that are separated by an oxygen transport membrane having a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, and Ga, and wherein each of x, x', y, and y' has a value between 0 and 1, such that x+x'=1 and y+y'=1, and z is a number that varies to maintain electro-neutrality of the oxygen transport membrane, ii) a first inlet and a first outlet located on the feed side, iii) a second inlet and a second outlet located on the combustion side, wherein a diameter ratio of the second inlet to the first inlet is in the range of 1:2 to 1:10.

In one embodiment, the system further includes i) an oxygen supplying unit located upstream of and fluidly connected to the first inlet via an oxygen line which supplies an oxygen-containing stream to the feed side, ii) a fuel supplying unit located upstream of and fluidly connected to the second inlet via a fuel line which supplies the methane stream to the combustion side.

In one embodiment, the vessel is cylindrical with a first and a second end separated by a side wall along a longitudinal axis of the vessel, the oxygen transport membrane has a longitudinal axis which is perpendicular to the longitudinal axis of the vessel, the first and second inlets are parallel to the longitudinal axis of the vessel and perpendicular to the longitudinal axis of the oxygen transport membrane.

In one embodiment, the vessel has a longitudinal axis, the oxygen transport membrane has a longitudinal axis which is parallel to the longitudinal axis of the vessel, and the first and second inlets are perpendicular to the longitudinal axis of the vessel.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1E is a magnified representation of the oxygen transport membrane in the oxygen transport membrane assembly having a rectangular geometry.

DETAILED DESCRIPTION OF THE EMBODIMENTS

Figures 1A, 1B:
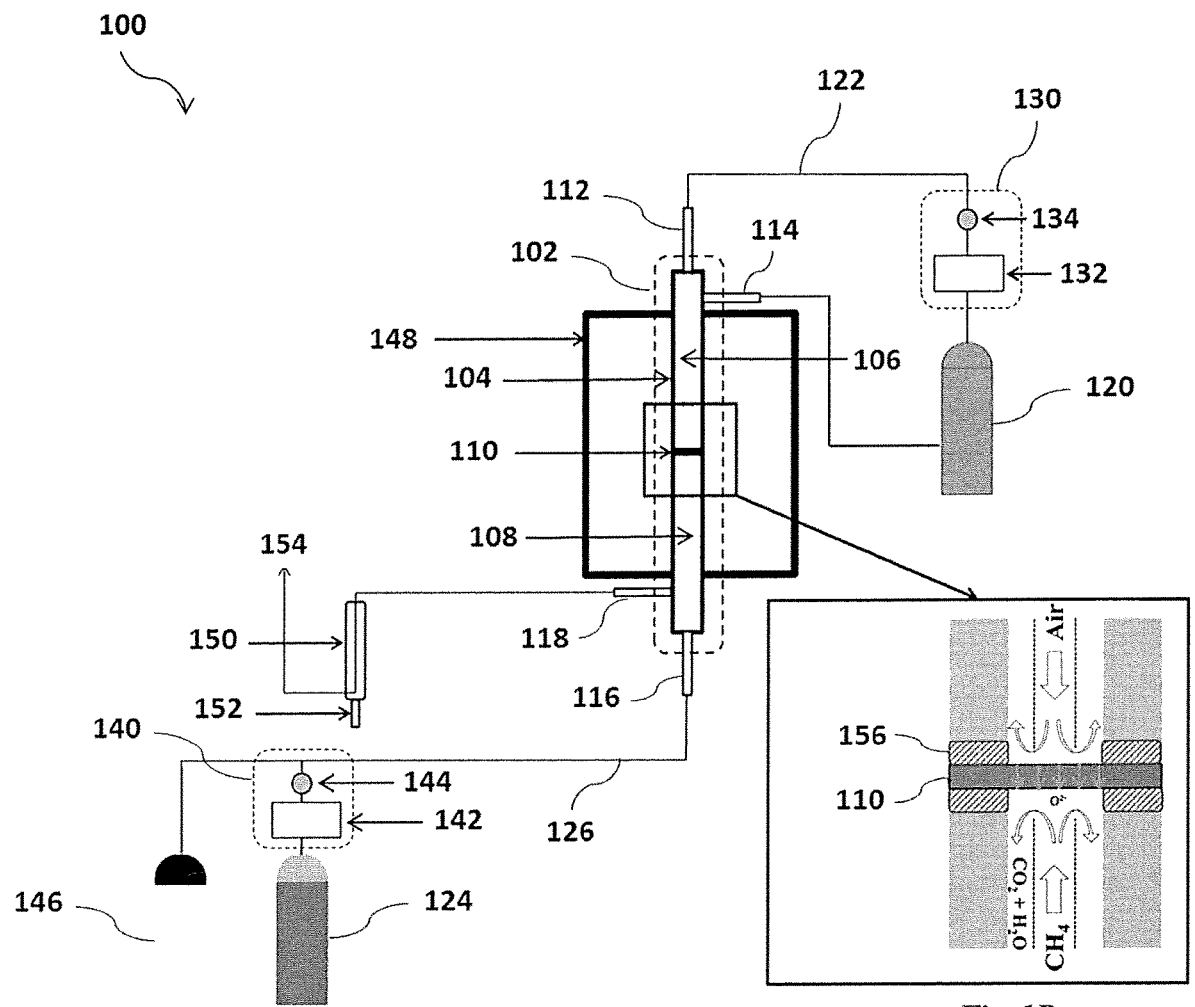
FIG. 1A is a schematic of system for combusting a methane stream having an oxygen transport membrane assembly.
FIG. 1B is a magnified representation of an oxygen transport membrane in the oxygen transport membrane assembly.

Referring now to the drawings, wherein like reference numerals designate identical or corresponding parts throughout the several views.

Figure 3:
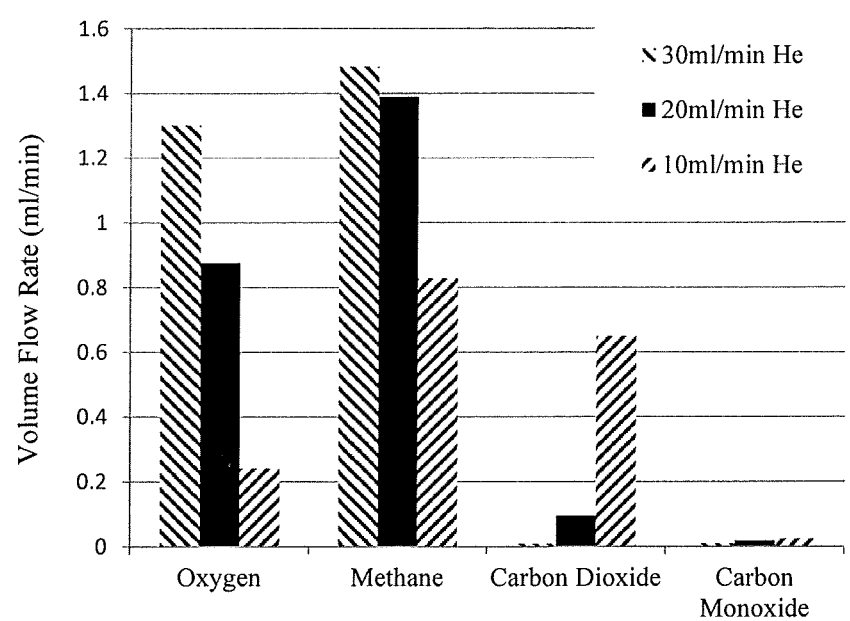
FIG. 3 represents an effect of the flow rate of the sweep gas on combustion reactions at 920° C. using 1.4 mm thick BSCF membrane and a methane stream flow rate of 1.5 ml/min. Helium have been mixed to the methane stream to provide total flow rates of 10, 20, and 30 ml/min.

According to a first aspect the present disclosure relates to a system 100 for combusting a methane stream 162 including an oxygen transport membrane assembly 102 (see FIG. 3).

As used herein, the oxygen transport membrane assembly 102 includes a vessel 104 with an internal cavity having a feed side 106 and a combustion side 108 (or permeate side) that are separated by an oxygen transport membrane 110. The oxygen transport membrane assembly 102 further includes a first inlet 112 and a first outlet 114 located on the feed side 106, as well as a second inlet 116 and a second outlet 118 located on the combustion side 108. The first inlet 112 and the first outlet 114 are utilized as passages for loading and unloading the feed side 106 with an oxygen-containing stream 160, whereas the second inlet 116 and the second outlet 118 are utilized as passages for loading and unloading the combustion side 108 with a methane stream 162. In addition, the oxygen transport membrane assembly 102 may also include other components such as, but not limited to a gas feed assembly, a manifold, an adaptor, or a gas connector. In one embodiment, an interior surface of the assembly may be coated with an oxidation resistant layer such as alumina, quartz and/or Pyrex® lining to minimize internal surface oxidation of the assembly.

The vessel 104 refers to a container with an internal cavity that is configured to hold a gaseous mixture at elevated temperatures and pressures, for example, in a preferred embodiment, the vessel 104 is configured to hold a gaseous mixture at a temperature in the range of 800-1,500° C., preferably 800-1,200° C., more preferably 800-1,000° C., and a pressure in the range of 1-100 atm, preferably 1-50 atm, more preferably 10-50 atm. The vessel 104 may be made of alumina, quartz, stainless steel, nickel steel, chromium steel, aluminum, aluminum alloy, copper and copper alloys, titanium, and the like, although the materials used to construct the vessel are not meant to be limiting and various other materials may also be used. In one embodiment, the vessel is made of a metal or an alloy such as stainless steel, nickel steel, chromium steel, aluminum, aluminum alloy, copper and copper alloys, titanium, and the like, and an alumina, quartz and/or a Pyrex® lining is used to minimize internal surface oxidation of the vessel. However, in a preferred embodiment, the vessel 104 is made of a high-temperature duty ceramic composite that can endure a temperature of up to 1,500° C., preferably up to 2,000° C., more preferably up to 2,500° C.

Figure 1C:
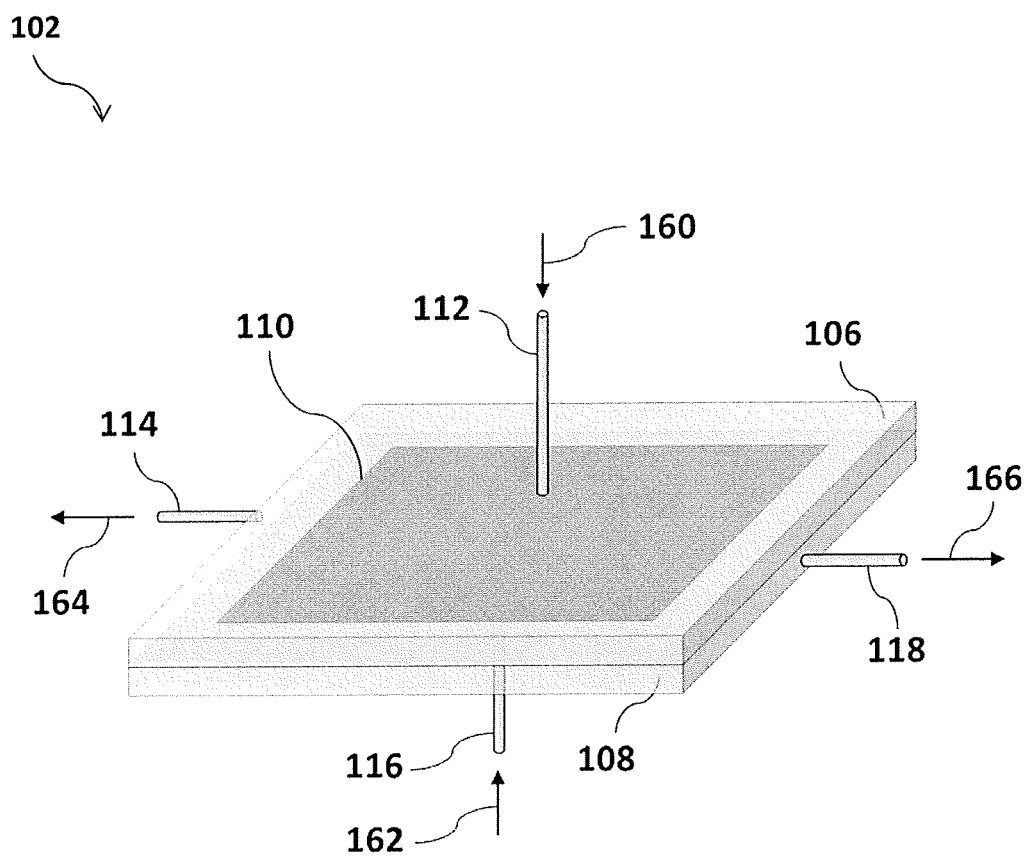
FIG. 1C illustrates the oxygen transport membrane assembly having a rectangular geometry.
Figure 1D:
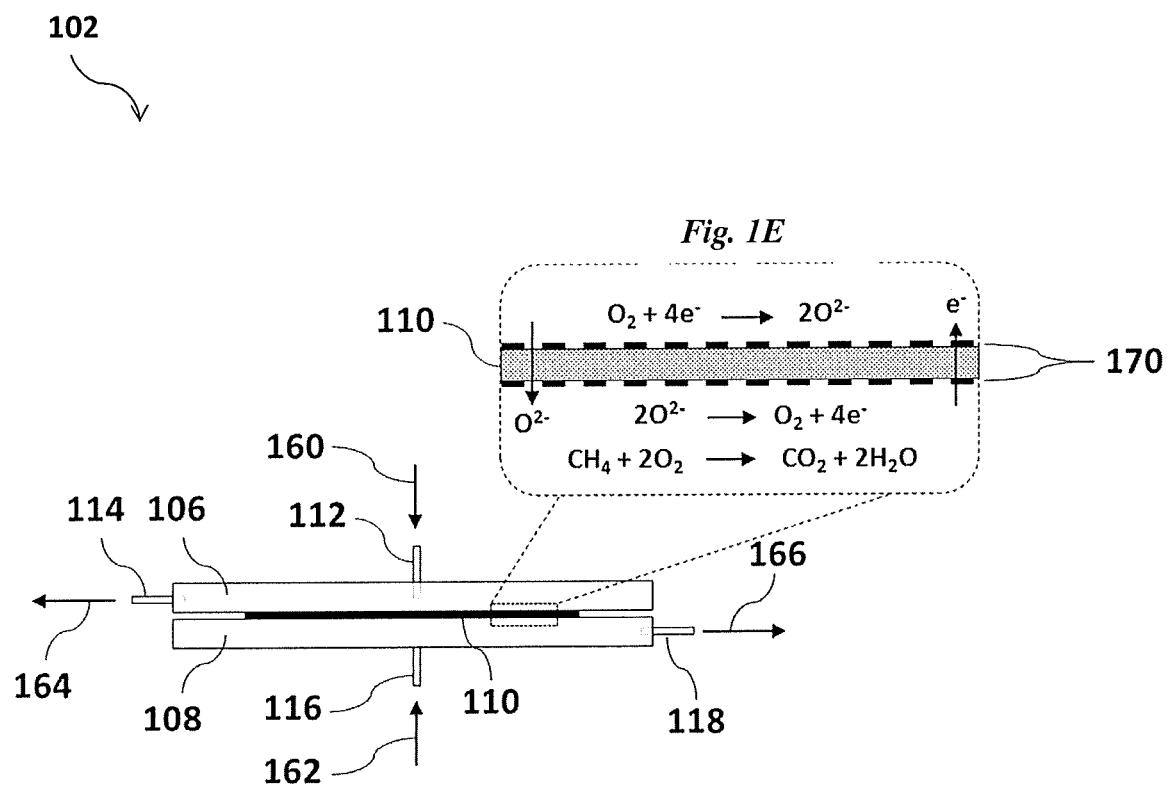
FIG. 1D is a side view of the oxygen transport membrane assembly having a rectangular geometry.
Figure 1F:
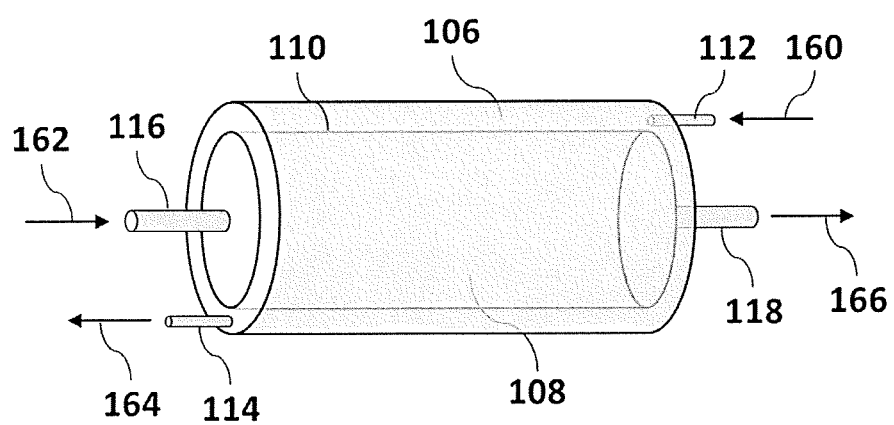
FIG. 1F illustrates the oxygen transport membrane assembly having a cylindrical geometry.

In one embodiment, the vessel 104 is rectangular having an internal volume in the range of 0.0001-50 $m^3$, or preferably 0.001-10 $m^3$, or preferably 0.01-5 $m^3$, or preferably 0.1-4 $m^3$, or preferably 0.2-2 $m^3$, or preferably 0.3-1 $m^3$. The rectangular vessel has a length (L), a width (W), and a height (H). In one embodiment, the length-to-width ratio (i.e. L/W) is in the range of 1-20, preferably 1-10, more preferably 1-5, even more preferably 1-2, and most preferably about 1. In one embodiment, the height-to-length ratio (i.e. H/L) is in the range of 0.05-1, preferably 0.05-0.5, more preferably 0.05-0.2, even more preferably 0.05-0.1, and most preferably about 0.1. The vessel 104 may also have other geometries including, but not limited to cubic, cylindrical, spherical, oblong, conical, and pyramidal. In a preferred embodiment, the vessel 104 is rectangular having a longitudinal axis parallel to a ground surface (as shown in FIGS. 1C and 1D). In one embodiment, the vessel is a portion of a pipe having upstream and downstream portions divided by the oxygen transport membrane 110 (as shown in FIG. 1A). In another embodiment, the vessel 104 is cylindrical and the oxygen transport membrane 110 is oriented such that the internal cavity of the vessel is separated into a first and a second concentric cylindrical zone, wherein said first zone being the feed side 106 and said second zone being the combustion side 108 (as shown in FIG. 1F). Similarly, in another embodiment, the vessel is spherical and the oxygen transport membrane is oriented such that the internal cavity of the vessel is separated into a first and a second concentric spherical zone (i.e. a core-shell structure), wherein said first zone being the feed side 106 and said second zone being the combustion side 108.

The oxygen transport membrane (OTM), as used in the assembly, functions to separate oxygen from air or other oxygen-containing gaseous mixtures by transporting oxide ions (i.e. $O^{2-}$) through a material that is capable of conducting oxide ions and electrons at elevated temperatures. When a partial pressure difference of oxygen is applied on opposite sides of such a membrane, oxygen molecules ionize on one surface of the membrane and emerge on an opposite side of the membrane as oxide ions. Then the oxide ions recombine into elemental oxygen. Free electrons resulting from the combination of oxide ions will be transported back through the membrane to ionize another oxygen molecule (this concept is depicted in FIG. 1E). The oxygen transport membrane 110 is a semi-permeable membrane that allows passage of oxide ions (i.e. $O^{2-}$) from the feed side 106 to the combustion side 108. The semi-permeable membrane refers to a membrane that allows molecules or ions (in this case oxide ions) with a certain Stokes radius to pass through it by diffusion. Stokes radius of a substance in a membrane refers to the radius of a hard sphere that diffuses at the same rate as that substance through the membrane. Diffusion refers to a passage of the oxide ions through the OTM, and diffusivity is a passage rate of the oxide ions, which is determined by a differential in oxygen partial pressure on both sides of the OTM as well as a volume fraction (or a number) of oxide ion vacancies present in the OTM.

As used herein, the terms "oxygen transport membrane" and "ion transport membrane" are used synonymously, since oxide ions (i.e. $O^{2-}$) diffuse through the membrane.

As used herein, the feed side 106 of the oxygen transport membrane assembly 102 refers to a space inside the vessel that is configured to hold an oxygen-containing gaseous mixture. Similarly, the combustion side 108 (or permeate side) refers to a space inside the vessel wherein a fuel stream (e.g. a methane stream) is combusted. The feed side 106 and the combustion side 108 are separated by the OTM. When an oxygen molecule present in an oxygen-containing gaseous mixture is contacted with the feed side 106 of the OTM, the oxygen molecule may be reduced and an oxide ion (i.e. $O^{2-}$) may be formed. The oxide ions may be transported through the oxygen transport membrane 110 and may be combined into elemental oxygens (i.e. $O_2$) on the combustion side of the oxygen transport membrane. A fuel stream (e.g. a methane stream) may be combusted in the presence of the elemental oxygens in the combustion side of the oxygen transport membrane assembly.

The OTM may have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula of the oxygen transport membrane has a value between 0 and 1, such that x+x'=1 and y+y'=1. Also, z is a number that varies to maintain electro-neutrality of the OTM. For example, in some embodiments, the OTM is a perovskite-type ceramic having a composition of $Ba_uBi_wCo_xFe_yO_{3-\delta}$, $Ba_uCo_wFe_xNb_yO_{3-\delta}$, $Ba_uFe_xNb_yO_{3-\delta}$, $Ba_wCe_xFe_yO_{3-\delta}$, $Ba_uSr_wCo_xFe_yO_{3-\delta}$, $Ba_uTi_wCo_xFe_yO_{3-\delta}$, $Ca_uLa_wFe_xCo_yO_{3-\delta}$, $Sr_uCa_wMn_xFe_yO_{3-\delta}$, $Sr_uCo_wFe_yO_{3-\delta}$, $La_2NiO_{4+\delta}$, $La_wCa_xFe_yO_{3-\delta}$, $La_wCa_xCo_yO_{3-\delta}$, $La_uCa_wFe_xCo_yO_{3-\delta}$, $La_uSr_wCo_yO_{3-\delta}$, $La_uSr_wTi_xFe_yO_{3-\delta}$, $La_uSr_wCo_xFe_yO_{3-\delta}$, $La_uSr_wGa_xFe_yO_{3-\delta}$, or $12.8La_vSr_wGa_yO_{3-\delta}$—$Ba_uSr_vFe_wCo_xFe_yO_{3-\delta}$, wherein u, v, w, x, and y are each in the range of 0-1, and δ varies to maintain electro-neutrality. In another embodiment, the OTM is a perovskite-type ceramic having a composition of $La_{1-x}Sr_xCoO_{3-\delta}$ with x in the range of 0.1-0.7.

In one embodiment, the OTM is doped with a metallic element selected from the group consisting of Ni, Co, Ti, Zr, and La. In another embodiment, the OTM is doped with a metallic element selected from the lanthanide group of the periodic table (i.e. metallic chemical elements with atomic numbers 57 through 71).

In a preferred embodiment, the oxygen transport membrane 110 is $Ba_{0.5}Sr_{0.5}Co_{0.8}Fe_{0.2}O_{3-z}$ (or BSCF). Said BSCF membrane may be doped with at least one element selected from the group consisting of Ni, Co, Ti, Zr, Ga, Ce, Ca, Mn, Nb, Bi, and a metallic element selected from the lanthanide group (i.e. elements with atomic numbers 57 through 71) of the periodic table. In one embodiment, the oxygen transport membrane 110 is $Ba_{0.5}Sr_{0.5}Co_{0.8}Fe_{0.2}O_{3-z}$ which has at least one coating layer having a composition of $RBaCO_2O_{5+\delta}$, wherein R is a metallic element selected from the lanthanide group (i.e. elements with atomic numbers 57 through 71) of the periodic table. Preferably R is at least one element selected from the group consisting of Pr, Nd, Sm, and Gd. In another embodiment, the oxygen transport membrane 110 is $Ba_{0.5}Sr_{0.5}Co_{0.8}Fe_{0.2}O_{3-\delta}$, which has pores in the size range of 0.1-10 nm, preferably 0.5-5 nm, more preferably 0.5-3 nm.

In one embodiment, a selectivity of the oxygen transport membrane 110 with respect to oxide ions (i.e. $O^{2-}$) is at least 90%, preferably at least 92%, more preferably at least 95%, even more preferably at least 99%. Selectivity with respect to an ion (e.g. oxide ions), as used herein, is a measure of the capability of a given oxygen transport membrane to transport the ion (e.g. oxide ions). For example, if selectivity of an OTM with respect to oxide ions is 99%, then 99 wt % of permeated substances through the membrane are oxide ions. Selectivity of an OTM with respect to oxide ions may be determined by the size of vacancies present in the crystal structure of the OTM. Oxide ions form in a reduction reaction when elemental oxygen is contacted with the feed side of an OTM in the presence of free electrons. An OTM having a 100% selectivity with respect to oxide ions only allows the oxide ions to permeate through the membrane. In one embodiment, a selectivity of the oxygen transport membrane with respect to carbon dioxide, elemental nitrogen, water vapor, carbon monoxide, argon, and sulfur is less than 5%, preferably less than 2%, more preferably less than 1%, even more preferably less than 0.5%.

A surface area of the OTM may be in the range of 1 $cm^2$-10 $m^2$, preferably 0.5-4 $m^2$, more preferably 0.5-2 $m^2$. In some embodiments, the oxygen transport membrane 110 has a thickness in the range of 0.5-3 mm, preferably 0.5-2 mm, more preferably 0.5-1.5 mm, most preferably 1-1.5 mm, whereas an oxygen flux of the oxygen transport membrane is within the range of 0.5-2.5 $\mu mol \cdot cm^{-2} \cdot s^{-1}$, preferably 0.5-2 $\mu mol \cdot cm^{-2} \cdot s^{-1}$, more preferably 0.7-1.5 $\mu mol \cdot cm^{-2} \cdot s^{-1}$ at a temperature in the range of 800-1,500° C., preferably 800-1,200° C., more preferably 800-1,000° C. In one embodiment, the temperature of the oxygen transport membrane is maintained in the range of 800-1,500° C., preferably 800-1,200° C., more preferably 800-1,000° C. via a furnace 148 that covers at least a portion of the vessel (as shown in FIG. 1A). The furnace 148 may cover at least 50%, preferably at least 80%, more preferably at least 90% of an external surface area of the vessel.

In some preferred embodiments, the oxygen transport membrane 110 is $Ba_{0.5}Sr_{0.5}Co_{0.8}Fe_{0.2}O_{3-z}$, wherein a thickness of the oxygen transport membrane is in the range of 0.8-1.5 mm, preferably 1-1.4 mm, more preferably about 1 mm, and an oxygen flux of the oxygen transport membrane is within the range of 0.8-1.5 $\mu mol \cdot cm^{-2} \cdot s^{-1}$, preferably 0.8-1.3 $\mu mol \cdot cm^{-2} \cdot s^{-1}$, more preferably 1-1.25 $\mu mol \cdot cm^{-2} \cdot s^{-1}$, even more preferably around 1.2 $mol \cdot cm^{-2} \cdot s^{-1}$ at a temperature in the range of 800-1,500° C., preferably 800-1,200° C., more preferably 800-1,000° C.

In one embodiment, the OTM is supported by a meshed structure 170 having rectangular, triangular, hexagonal, or spherical meshes. Each mesh of the meshed structure may have a surface area in the range of 1-500 $mm^2$, preferably 1-400 $mm^2$, more preferably 1-300 $mm^2$, even more preferably 1-100 $mm^2$. The meshed structure 170 may be made of a high-temperature duty ceramic composite that can endure a temperature of up to 1,500° C., preferably up to 2,000° C., more preferably up to 2,500° C.

In one embodiment, the OTM 110 is secured inside the vessel 104 with threaded fittings and/or bolts and nuts, and O-rings 156 (e.g. ceramic or metal rings) and/or gaskets are used to seal the internal cavity of the vessel 104.

The oxygen transport membrane assembly 102 further includes a first inlet 112 and a first outlet 114 located on the feed side 106. The first inlet 112 and the first outlet 114 are utilized as passages for loading and unloading the feed side with an oxygen-containing stream 160. In one embodiment, the first inlet and the first outlet are substantially similar, wherein each is a cylindrical port having an internal diameter in the range of 1-50 mm, preferably 5-20 mm, more preferably 5-10 mm, even more preferably about 5 mm, and are configured to transfer a gaseous stream having a flow rate in the range of 0.1-100 L/min, preferably 1-50 L/min, or preferably 1-20 L/min, more preferably 5-15 L/min, even more preferably about 10 L/min.

In a preferred embodiment, a first flow-rate control system 130 is disposed on an oxygen line 122 to adjust a volumetric flow rate of the oxygen-containing stream 160 that goes in and out of the feed side 106 of the vessel 104. In some embodiments, the first flow-rate control system 130 comprises a first flow-meter 134 and a first flow control valve disposed on the oxygen line 122. Furthermore, a first control unit 132 is disposed thereon which receives an input signal from the first flow-meter 134 and provides an output signal to the first control valve. The valve may be check valves or diaphragm valves, although the valve type is not meant to be limiting and various other type of valves may also be used. In one embodiment, the first flow-rate control system 130 adjusts the volumetric flow rate of the oxygen-containing stream 160 to be within the range of 0.1-500 L/min, preferably 1-400 L/min, or preferably 10-350 L/min, more preferably 100-300 L/min per 1.0 $m^2$ surface area of the oxygen transport membrane.

The oxygen transport membrane assembly 102 further includes a second inlet 116 and a second outlet 118 located on the combustion side 108. In one embodiment, specification of the second inlet 116 and the second outlet 118 are substantially similar to that of the first inlet 112 and the first outlet 114, as described previously.

In a preferred embodiment, a second flow-rate control system 140 is disposed on a fuel line 126 to adjust a volumetric flow rate of the methane stream 162 that goes in and out of the combustion side 108 of the vessel 104. In some embodiments, the second flow-rate control system 140 comprises a second flow-meter 144 and a second control valve disposed on the fuel line 126. Furthermore, a second control unit 142 is disposed thereon which receives an input signal from the second flow-meter 144 and provides an output signal to the second control valve. The valves may be check valves or diaphragm valves, although the valve type is not meant to be limiting and various other type of valves may also be used. In one embodiment, the second flow-rate control system 140 adjusts the volumetric flow rate of the methane stream 162 to be within the range of 0.1-50 L/min, preferably 1-20 L/min, more preferably 5-15 L/min, even more preferably about 10 L/min per 1.0 $m^2$ surface area of the oxygen transport membrane, such that a molar flow rate ratio of methane to molecular oxygen (permeated through the OTM) is within the range of 1:2.1 to 1:3, preferably 1:2.1 to 1:2.5. In the embodiment wherein the oxygen transport membrane is $Ba_{0.5}Sr_{0.5}Co_{0.8}Fe_{0.2}O_{3-z}$, the volumetric flow rate of the methane stream 162 is maintained in the range of 5-15 L/min, preferably 6-12 L/min, more preferably around 10 L/min per 1.0 $m^2$ surface area of the oxygen transport membrane.

In a preferred embodiment, a diameter ratio of the second inlet to the first inlet is in the range of 1:2 to 1:10, preferably 1:2 to 1:8, more preferably 1:2 to 1:6. In one embodiment, the first inlet 112 and the first outlet 114 are substantially similar and the second inlet 116 and the second outlet 118 are also substantially similar, wherein the diameter ratio of the second inlet to the first inlet is in the range of 1:2 to 1:10, preferably 1:2 to 1:8, more preferably 1:2 to 1:6. In another embodiment, none of the first and the second inlets, and the first and the second outlets are the same, wherein the diameter ratio of the second inlet to the first inlet and the diameter ratio of the second outlet to the first outlet are within the range of 1:2 to 1:10, preferably 1:2 to 1:8, more preferably 1:2 to 1:6.

In one embodiment, the vessel 104 has a rectangular geometry with a longitudinal axis and the oxygen transport membrane 110 has a longitudinal axis which is parallel to the longitudinal axis of the vessel, wherein the first and second inlets are located perpendicular to the longitudinal axis of the vessel, and the first and the second outlets are located parallel to the longitudinal axis of the vessel (as shown in FIGS. 1C and 1D). In one embodiment, the vessel 104 has a horizontally oriented cylindrical geometry with a longitudinal axis and the oxygen transport membrane 110 has a longitudinal axis which is parallel to the longitudinal axis of the vessel, wherein the first and second inlets are located perpendicular to the longitudinal axis of the vessel, and the first and the second outlets are located parallel to the longitudinal axis of the vessel. In one embodiment, the vessel 104 has a vertically oriented cylindrical/rectangular geometry with a longitudinal axis and the oxygen transport membrane 110 has a longitudinal axis which is perpendicular to the longitudinal axis of the vessel, wherein the first and second inlets are located parallel to the longitudinal axis of the vessel, and the first and the second outlets are located perpendicular to the longitudinal axis of the vessel (as shown in FIG. 1A). In another embodiment, the vessel 104 has a horizontally/vertically oriented cylindrical geometry with a longitudinal axis and the oxygen transport membrane 110 is cylindrical with a longitudinal axis which is parallel to the longitudinal axis of the vessel, wherein the oxygen transport membrane is oriented such that the internal cavity of the vessel is separated into a first and a second concentric cylindrical zone, wherein said first zone being the feed side 106 and said second zone being the combustion side 108 (as shown in FIG. 1F).

Other than inlets/outlets designed to allow ingress and egress, the vessel 104 may be sealed to prevent any leakage of the oxygen-containing stream 160 and/or the methane stream 162.

The system 100 for combusting the methane stream further includes an oxygen supplying unit 120 located upstream of and fluidly connected to the first inlet 112 via an oxygen line 122. The oxygen supplying unit 120 supplies the oxygen-containing stream 160 to the feed side 106. In a preferred embodiment, the oxygen supplying unit 120 is a pressurized air cylinder or a pressurized oxygen cylinder.

In an alternative embodiment, the oxygen supplying unit 120 may be a series of operational units that turns a gaseous mixture (e.g. air) into an oxygen-containing stream with specific characteristics (e.g. high oxygen partial pressure), and further delivers the oxygen-containing stream to the feed side 106 of the oxygen transport membrane assembly. Accordingly, the gaseous mixture may refer to any gas stream that comprises oxygen (e.g. air). The gaseous mixture is processed via a set of operational units within the oxygen supplying unit 120, whereby characteristics of the gaseous mixture such as oxygen content, pressure, temperature, flow rate, water content, etc. are adjusted. For example, in one embodiment, the oxygen supplying unit 120 includes an operational unit that increases an oxygen content (and oxygen partial pressure) of the oxygen-containing stream 160 by separating non-oxygen substances (e.g. nitrogen, carbon dioxide, and water vapor) present in the oxygen-containing stream. In another embodiment, the oxygen supplying unit 120 further includes a dehydrator and/or a dehumidifier, whereby a water content of the oxygen-containing stream 160 is reduced to less than 1.0 vol %, preferably less than 0.5 vol %, more preferably less than 0.1 vol %, even more preferably less than 0.01 vol %, with volume percent being relative to the total volume of the oxygen-containing stream. Pressure and temperature of the oxygen-containing stream 160 may also be adjusted with a compressor in the oxygen supplying unit. In one embodiment, the temperature of the oxygen-containing stream 160 is raised to a temperature in the range of 200-1,000° C., preferably 200-600° C., more preferably 300-500° C. Furthermore, the pressure of the oxygen-containing stream 160 is raised to a pressure in the range of 1-100 atm, preferably 1-50 atm, more preferably 1-10 atm.

In one embodiment, the oxygen-containing stream 160 comprises oxygen, nitrogen and less than 1% by volume of argon, carbon dioxide, neon, helium, hydrogen, and water vapor. In a preferred embodiment, a volumetric ratio of oxygen to the total volume in the oxygen-containing stream 160 is in the range of 20-99%, or preferably 60-99%.

The oxygen line 122 is a tubular channel that is configured to carry the oxygen-containing stream 160 from the oxygen supplying unit 120 to the first inlet 112 of the oxygen transport membrane assembly 102. In a preferred embodiment, the oxygen line 122 is made of a metal or an alloy that is coated with a polymer (e.g. epoxy), and is configured to bear a pressure up to 100 bars, preferably up to 200 bars, even more preferably up to 500 bars. In another embodiment, the oxygen line 122 is made of a polymer (e.g. PVC), and is configured to bear a pressure up to 50 bars, preferably up to 100 bars, even more preferably up to 200 bars.

The system 100 for combusting the methane stream further includes a fuel supplying unit 124 located upstream of and fluidly connected to the second inlet 116 via a fuel line 126. The fuel supplying unit 124 supplies the methane stream 162 to the combustion side 108, wherein methane in the methane stream is combusted upon contacting the combustion side 108 of the oxygen transport membrane 110. In a preferred embodiment, the fuel supplying unit 124 is a pressurized methane cylinder or a pressurized oxygen cylinder.

In an alternative embodiment, the fuel supplying unit 124 may be a series of operational units that turn a hydrocarbon gaseous mixture (i.e. methane, ethane, etc.) into a methane stream having specific characteristics (e.g. high oxygen partial pressure), and further delivers the methane stream to the combustion side 108 of the oxygen transport membrane assembly 102. Accordingly, the hydrocarbon gaseous mixture may be processed via a set of operational steps whereby physical characteristics of the hydrocarbon gaseous mixture such as oxygen content, pressure, temperature, flow rate, water content, etc. are adjusted. For example, in one embodiment, the fuel supplying unit 124 includes a dehydrator and/or a dehumidifier, whereby a water content of the methane stream 162 is reduced to less than 1.0 vol %, preferably less than 0.5 vol %, more preferably less than 0.1 vol %, even more preferably less than 0.01 vol %, with volume percent being relative to the total volume of the methane stream. Additionally, in another embodiment, the fuel supplying unit 124 further includes a sulfur separator to reduce a sulfur content of the methane stream 162 to less than 500 ppm, preferably less than 100 ppm, more preferably less than 50 ppm. Sulfur removal may be advantageous as this step prevents formation of sulfur dioxide in the combustion side of the oxygen transport membrane assembly. In one embodiment, the fuel supplying unit 124 further includes a compressor, wherein a pressure of the methane stream is adjusted to be within the range of 1-100 atm, preferably 1-50 atm, more preferably 10-50 atm. Subsequently, in one embodiment, the temperature of the methane stream 162 is raised to a temperature in the range of 200-1,000° C., preferably 200-600° C., more preferably 300-500° C. via a heat exchanger in the fuel supplying unit.

In a preferred embodiment, the methane stream 162 comprises methane and less than 0.1 vol %, preferably less than 0.05 vol %, more preferably less than 0.01 vol % of carbon dioxide, nitrogen, hydrogen, water vapor, carbon monoxide, hydrogen sulfide, argon, helium, and/or ethane.

In a preferred embodiment, the fuel line 126 is made of a metal or an alloy that is coated with a polymer (e.g. epoxy), and is configured to bear a pressure up to 100 bars, preferably up to 200 bars, even more preferably up to 500 bars. In another embodiment, the fuel line 126 is made of a polymer (e.g. PVC), and is configured to bear a pressure up to 50 bars, preferably up to 100 bars, even more preferably up to 200 bars.

In a preferred embodiment, the oxygen transport membrane assembly is made of internal and external concentric ceramic tubes (e.g. alumina tubes) having a gap therebetween, wherein the oxygen transport membrane disposed inside the assembly such that a longitudinal axis of the OTM is perpendicular to a longitudinal axis of the tubes. Accordingly, the oxygen-containing stream is pumped through the internal tube in the feed side, where it hits the OTM and escapes through the gap in between the internal and the external tubes. Similarly, the methane stream is pumped through the internal tube on the combustion side where it hits the OTM and escapes through the gap in between the internal and the external tubes. According to this embodiment, the internal tube ends before contacting the OTM on both the feed and the combustion sides to form a gap for the methane and the oxygen-containing streams to escape (this embodiment is depicted in FIG. 1B).

The present disclosure also relates to a method of combusting the methane stream involving delivering the oxygen-containing stream 160 to the feed side 106 of the oxygen transport membrane assembly via the oxygen line 122. In the embodiments where the oxygen supplying unit is not a pressurized air/oxygen cylinder (i.e. the oxygen supplying unit is a series of operational units), a first gas pump may be disposed on the oxygen line 122 to deliver the oxygen-containing stream 160 to the feed side of the oxygen transport membrane assembly, after the oxygen-containing stream has been prepared in the oxygen supplying unit 120, as described previously.

The method of combusting the methane stream further involves delivering the methane stream 162 to the combustion side 108 of the oxygen transport membrane assembly via the fuel line 126. In the embodiments where the fuel supplying unit is not a pressurized methane cylinder (i.e. the fuel supplying unit is a series of operational units), a second gas pump may be disposed on the fuel line 126 to deliver the methane stream to the combustion side of the oxygen transport membrane assembly, after the methane stream has been prepared in the fuel supplying unit 124, as described previously.

Methane present in the methane stream is combusted when contacted with molecular oxygens, and thus forming an exhaust stream 166 that comprises water vapor and carbon dioxide. The exhaust stream may have a temperature in the range of 500-1,200° C., preferably 800-1,200° C., more preferably 900-1,100° C. In addition, the exhaust stream may have a pressure in the range of 0.1-250 MPa, preferably 1-100 MPa, more preferably 1-50 MPa. In a preferred embodiment, the exhaust stream 166 includes water vapor and carbon dioxide, and less than 1.0 vol %, preferably less than 0.5 vol %, more preferably less than 0.1 vol % carbon monoxide, nitrogen, hydrogen, argon, helium, methane, and/or ethane.

In one embodiment, the method of combusting the methane stream further involves cooling the exhaust stream 166 to form a liquid phase 152 and a gaseous phase 154. The exhaust stream 166 may be cooled to room temperature (i.e. 25° C.) at atmospheric pressure. In another embodiment, the exhaust stream 166 may be cooled to a temperature in the range of 0-20° C., preferably 5-10° C. via using a refrigeration system 150. The liquid phase 152 includes water and may also include less than 1.0 vol %, preferably less than 0.5 vol % carbonic acid. The gaseous phase 154, however, includes carbon dioxide and no more than 0.5 vol %, preferably no more than 0.1 vol % of nitrogen, hydrogen, carbon monoxide, argon, helium, methane, and/or ethane.

In one embodiment, the method of combusting the methane stream further involves separating the liquid phase 152 from the gaseous phase 154, for example via a vapor-liquid separator. In a preferred embodiment, the gaseous phase 154 is nearly a pure carbon dioxide having at least 99 vol %, preferably at least 99.5 vol %, more preferably at least 99.9 vol % carbon dioxide, and thus the method further involves injecting the gaseous phase into a geological formation. The gaseous phase may also be used in supercritical extraction systems or in processes where a low/medium/high pressure carbon dioxide stream is needed.

In a preferred embodiment, no sweep gas is used along with the methane stream and the oxygen-containing stream, and both the methane and the oxygen-containing streams are delivered to the assembly without being diluted in another gaseous stream.

In an alternative embodiment, a sweep gas stream (provided by a sweep gas supply unit 146) is mixed with the methane stream 162 prior to delivering the methane stream to the combustion side 108 of the oxygen transport membrane assembly. The sweep gas stream may be utilized to stabilize methane combustion in the oxygen transport membrane assembly. In one embodiment, the sweep gas stream is carbon dioxide. In a preferred embodiment, a water content of the sweep gas stream is less than 1.0 vol %, preferably less than 0.5 vol %, more preferably less than 0.1 vol %, even more preferably less than 0.01 vol %. A volumetric flow rate ratio of the sweep gas stream to that of the methane stream 162 may be in the range of 1:10 to 1:2, preferably 1:10 to 1:5.

In some preferred embodiments, the oxygen transport membrane 110 is $Ba_{0.5}Sr_{0.5}Co_{0.8}Fe_{0.2}O_{3-z}$, wherein a thickness of the oxygen transport membrane is in the range of 0.8-1.5 mm, preferably 1-1.4 mm, more preferably about 1 mm, and an oxygen flux of the oxygen transport membrane is within the range of 0.8-1.5 $\mu mol \cdot cm^{-2} \cdot s^{-1}$, preferably 0.8-1.3 $\mu mol \cdot cm^{-2} \cdot s^{-1}$, more preferably 1-1.25 $\mu mol \cdot cm^{-2} \cdot s^{-1}$, even more preferably around 1.2 $mol \cdot cm^{-2} \cdot s^{-1}$ at a temperature in the range of 800-1,500° C., preferably 800-1,200° C., more preferably 800-1,100° C. Accordingly, the oxygen flux of the oxygen transport membrane may remain unchanged in the range of 0.8-1.5 $\mu mol \cdot cm^{-2} \cdot s^{-1}$, preferably 0.8-1.3 $\mu mol \cdot cm^{-2} \cdot s^{-1}$, more preferably 1-1.25 $\mu mol \cdot cm^{-2} \cdot s^{-1}$, even more preferably around 1.2 $\mu mol \cdot cm^{-2} \cdot s^{-1}$ at a temperature in the range of 800-1,500° C., preferably 800-1,200° C., more preferably 800-1,100° C., for at least 150 hours, preferably at least 180 hours, more preferably at least 200 hours, even more preferably at least 300 hours, when the volumetric flow rate of the methane stream 162 is within the range of 1-50 L/min, preferably 1-20 L/min, more preferably 5-15 L/min, even more preferably about 10 L/min per 1.0 $m^2$ surface area of the oxygen transport membrane. These volumetric flow rates provide a $CH_4: O_2$ molar flow rate ratio within the range of 1:2.1 to 1:3, preferably 1:2.1 to 1:2.5 (i.e. $O_2$ is in excess in combustion reactions).

In one embodiment, the method of combusting the methane stream further involves receiving a depleted stream 164 from the first outlet 114 of the oxygen transport membrane assembly, and recycling at least a portion of the depleted stream 164. The depleted stream 164 may include oxygen, nitrogen and less than 1% by volume of argon, carbon dioxide, neon, helium, hydrogen, and water vapor. In the embodiments where the oxygen supplying unit is a series of operational units, a portion of the depleted stream 164 is recycled to the oxygen supplying unit 120 to be processed and to be mixed with the oxygen-containing stream 160. The oxygen content of the depleted stream 164 may be at least 50%, preferably at least 40%, or preferably at least 30%, or preferably at least 20% lower than the oxygen content of the oxygen-containing stream 160. Therefore, the depleted stream 164 may be treated in the oxygen supplying unit 120, wherein the oxygen content of the depleted stream 164 is raised to be the same as that of the oxygen-containing stream. Furthermore, a temperature of the depleted stream 164 may be adjusted within the range of 600-1,200° C., preferably 800-1,000° C., whereas a pressure of the depleted stream may also be adjusted within the range of 1-50 atm, preferably 1-20 atm.

In one embodiment, a gas turbine is coupled to the second outlet of the system 100, wherein the exhaust stream 166 passes through vanes of the gas turbine. The gas turbine may also be coupled to a generator to produce electricity. In another embodiment, the exhaust stream 166 may be used to heat up a process stream in a power plant, a chemical processing plant, or a refining plant. Additionally, the exhaust stream may be used to operate heat engines. Furthermore, the exhaust stream may be used for operating pneumatic actuators and/or pneumatic systems in a power plant, a chemical processing plant, or a refining plant.

The examples below are intended to further illustrate protocols for the system of combusting the methane stream and the method of combustion thereof, and are not intended to limit the scope of the claims.

Example 1

$Ba_{0.5}Sr_{0.5}Co_{0.8}Fe_{0.2}O_{3-\delta}$ powder was prepared through modified Pechini method. Metal nitrates were mixed in aqueous solution using the stoichiometric proportions. Citric acid and ethylene glycol were used as chelating agent and polymerization agent, respectively. The solution was stirred and heated until a viscous gel was formed. The produced gel was calcined in a furnace at 250° C. for 30 minutes, and a foamy solid was formed. The product was crushed into powder, sieved and further heat treated at 600° C. for 10 hours to remove any residues. In order to reduce the grain size, the powder was milled in ethanol for 20 hours using alumina balls. The average grain diameter of the obtained powder was less than 1 µm.

Flat discs of 25 mm diameter were prepared by pressing the BSCF powder in an automatic press with 5000 kg. These discs were sintered at a temperature of 1120° C. for 5 hours. The heating and cooling rates were 1° C./min and 2° C./min, respectively. The membrane thickness of 1.0 mm and 1.4 mm were achieved using polishing grits.

The oxygen permeability was measured in an OTM reactor (as shown in FIG. 1A). The reactor was first used to measure the oxygen permeability of the BSCF membrane in the absence of any fuel. On the top surface of the membrane, air was continuously supplied at a flow rate of 20 ml/min. On the bottom surface of the membrane, permeate side, helium was used as the sweep gas to carry permeated oxygen to the gas chromatograph (GC). In order to evaluate the performance of the membranes in oxy-fuel conditions, methane/helium mixture and pure methane were applied as the sweep gas. The GC was calibrated to measure all possible gas species present in the sweep after combustion i.e. carbon dioxide, carbon monoxide, methane, oxygen and nitrogen. The water steam, produced by the combustion reaction, was condensed before reaching the GC using condenser with a circulating bath set at 5° C.

Example 2

Figure 2:
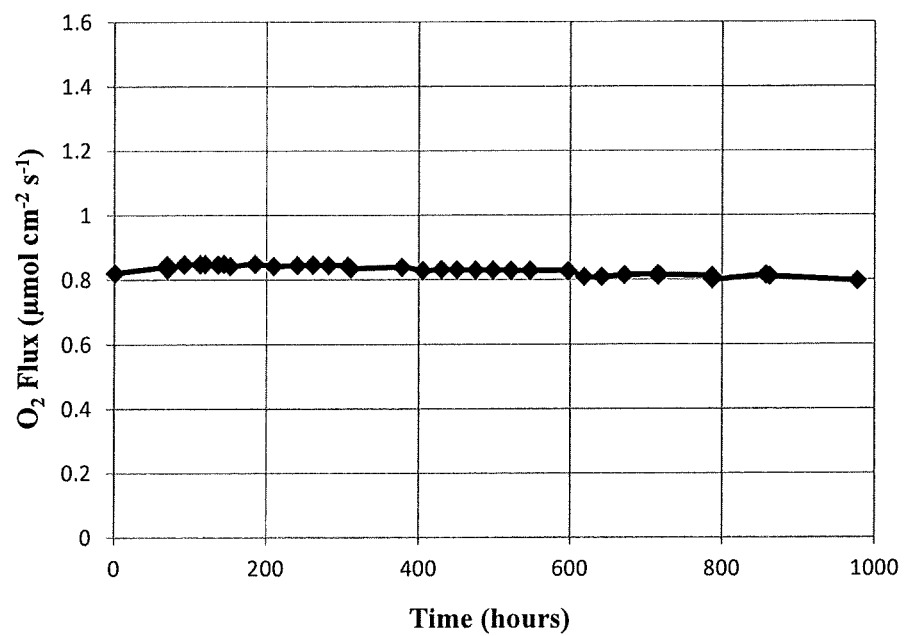
FIG. 2 represents an oxygen flux vs. time for a 1.4 mm thick BSCF membrane over a period of 1,000 hours at 920° C. Helium is used as a sweep gas at a flow rate of 30 ml/min.

In order to validate the long-term stability of the BSCF material, the oxygen permeability of a 1.4 mm thick BSCF membrane has been measured for more than 1000 hours. Silver rings were used to seal the membrane between the alumina tubes of the OTM reactor and the test was carried out at 920° C. The oxygen permeated by the membrane was carried from the reactor to the gas chromatograph using Helium supplied at a rate of 30 ml/min. Even for such a prolonged time, the BSCF membrane showed excellent stability with a consistent oxygen flux value of around 0.83 $\mu mol \cdot cm^{-2} \cdot s^{-1}$ (FIG. 2). Similar values were reported in the literature [M. A. Habib, H. M. Badr, S. F. Ahmed, R. Ben-Mansour, K. Mezghani, S. Imashuku, G. J. la O', Y. Shao-Horn, N. D. Mancini, A. Mitsos, P. Kirchen, and A. F. Ghoneim, "A review of recent developments in carbon capture utilizing oxy-fuel combustion in conventional and oxygen transport membrane systems," *Int. J. Energy Res.*, vol. 35, no. 9, pp. 741-764, 2011]. For example, Menzler et al. [N. H. Menzler, F. Han, T. van Gestel, W. Schafbauer, F. Schulze-Küppers, S. Baumann, S. Uhlenbruck, W. a. Meulenberg, L. Blum, and H. P. Buchkremer, "Application of Thin-Film Manufacturing Technologies to Solid Oxide Fuel Cells and Gas Separation Membranes," *Int. J. Appl. Ceram. Technol.*, vol. 10, no. 3, pp. 421-427, May 2013] has measured the oxygen permeability of a 1.0 mm thick BSCF membrane at 900° C. to be 1.45 ml min$^{-1}$ cm$^{-2}$ (0.98 µmol cm$^{-2}$ s$^{-1}$). Shen et al. [Z. Shen, P. Lu, G. Yan, and X. Hu, "Enhancing the oxygen permeability of $Ba_{0.5}Sr_{0.5}Co_{0.8}Fe_{0.2}O_{5+\delta}$ membranes by coating $RBaCO_2O_{5+\delta}$ (R=Pr, Nd, Sm, Gd) layers," *Mater. Lett.*, vol. 64, no. 8, pp. 980-982, April 2010] has studied a 1.5 mm thick BSCF membrane at 850° C. and has found the oxygen flux to be 0.92 ml min$^{-1}$ cm$^2$ (0.627 µmol cm$^{-2}$ s$^{-1}$).

Example 3

Issues with the BSCF stability arises when the membrane is operating inside a combustion reactor where the $CO_2$ is a major product of the reaction. Therefore, one of the most adopted methods to test the stability of OTM membranes is the use of $CO_2$ as a sweep gas. It has been reported that when the $CO_2$ percentage in the sweep is more than 25% the oxygen permeability of the BSCF membrane decreases considerably, and when pure $CO_2$ is used as the sweep gas, the BSCF membrane completely fails immediately [M. Arnold, H. Wang, and a Feldhoff, "Influence of $CO_2$ on the oxygen permeation performance and the microstructure of perovskite-type $(Ba_{0.5}Sr_{0.5})(Co_{0.8}Fe_{0.2})O_{3-\delta}$ membranes," *J. Memb. Sci.*, vol. 293, no. 1-2, pp. 44-52, April 2007]. Engels et al. [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011] used BSCF tube membranes and showed that when 5% $CO_2$ was used as sweep there was a drop of 6% in oxygen permeability but the performance of the membrane was stable. When the $CO_2$ concentration in the sweep gas was increased by 15%, the oxygen permeability was decreased by 80%, within 200 min.

In this work, instead of using the above mentioned method to evaluate BSCF membranes, a more direct approach has been adopted by introducing fuel (methane) in the reactor at high temperature and carrying out actual combustion. As a first step, a constant volume flow rate of 1.5 ml/min methane was added to the helium sweep gas. Different flow rates (10, 20 and 30 ml/min) of the mixture were studied. Since the methane flow was maintained at a constant rate of 1.5 ml/min, the change of the total flow rate of the mixed gas (helium and methane) from 30 to 10 ml/min has changed the methane concentration from 5 to 15%, respectively. It was evident from the results of FIG. 3 that at high flow rate (30 ml/min) or low methane concentration (5%), only 0.02 ml/min of methane has reacted; the remaining 1.48 ml/min did not have a chance to contact oxygen molecules for reaction. Also for the same flow rate, negligible amount of $CO_2$ and CO were detected. Decreasing the quantity of Helium while keeping methane quantity fixed has improved the combustion. The amounts of oxygen and methane have decreased from 1.30 and 1.48 ml/min to 0.24 and 0.83 ml/min, respectively, when the flow rates were decreased from 30 ml/min to 10 ml/min. On the other hand, $CO_2$ has increased from being negligible in the sweep to 0.65 ml/min. Nevertheless, the presence of both methane and oxygen in the sweep revealed that the reaction was not completed.

It can be concluded that the methane concentration in the sweep gas and the total flow rate have affected the combustion reactions. Accordingly, the combustion reactions prefer low flow rate of the gas mixture and high concentration of methane in the sweep gas.

Example 4

The following experiments were conducted without using helium as the sweep gas and only pure methane was flowing into the reactor from the permeate side. It should be noted that Helium gas played two major roles in the OTM reactor. Firstly, it created low oxygen partial pressure at the sweep side of the membrane. Usually, for higher flow rates lower oxygen partial pressures would be generated, leading to higher membrane permeability [M. A. Habib, H. M. Badr, S. F. Ahmed, R. Ben-Mansour, K. Mezghani, S. Imashuku, G. J. la O', Y. Shao-Horn, N. D. Mancini, A. Mitsos, P. Kirchen, and A. F. Ghoneim, "A review of recent developments in carbon capture utilizing oxy-fuel combustion in conventional and oxygen transport membrane systems," *Int. J. Energy Res.*, vol. 35, no. 9, pp. 741-764, 2011]. Secondly, the helium flow was needed to carry the oxygen to the online GC instrument for gas analysis. Here also, higher flow rates were preferred for faster data collection. In the absence of helium, as a sweep gas, the methane gas had to accomplish the two tasks that used to be carried out by helium; i.e. creating low oxygen partial pressure and delivering the gas mixture to the GC for analysis. The first task could be accomplished by methane as it reacted with oxygen near or at the membrane surface; therefore, it created low oxygen partial pressure. In addition, if all available oxygen molecules at the membrane surface reacted with methane then lower partial pressure could be created with low flow rates of methane compared to the partial pressure produced using high flow rates of helium. The second task could also be accomplished using pure methane gas; however, for low flow rates, longer time was needed to deliver the gas mixture to the online GC instrument. As a matter of fact, the gas-sample collection time has increased from few minutes using helium (at 30 ml/min) to few hours using pure methane at 1.5 ml/min. Large portion of the sampling time was important for flashing the reactor chamber and the delivering tubes.

Example 5

Figure 4:
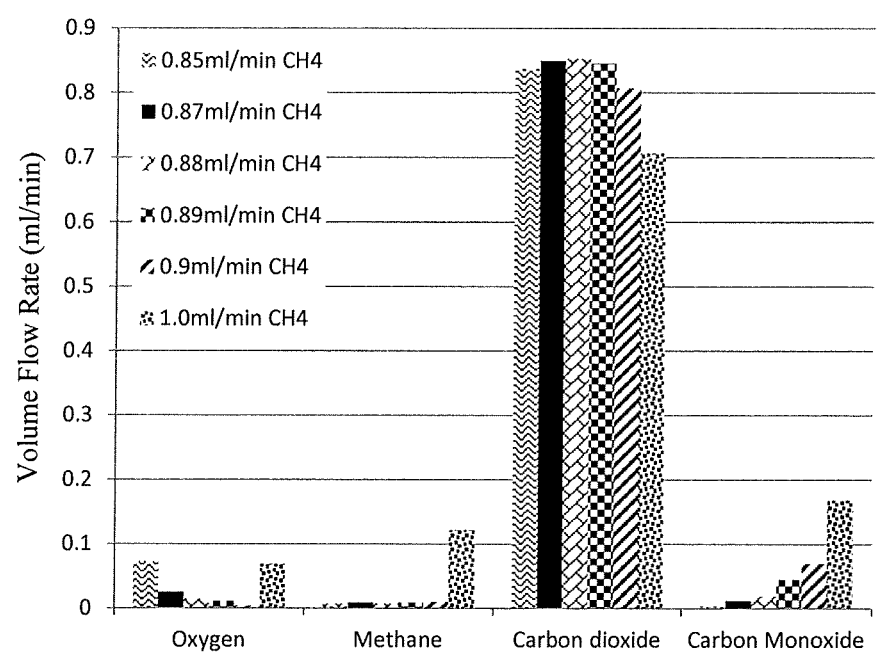
FIG. 4 represents an effect of the methane stream flow rate on combustion reactions at 920° C. using 1.4 mm thick BSCF membrane.

The effect of methane flow rate on the combustion reaction has been studied in the range of 0.65 to 1.0 ml/min at constant temperature of 920° C. The results of FIG. 4 show that for 1.0 ml/min methane, there is a presence of both oxygen and methane in the permeate stream. This means that not all oxygen has been consumed even when the methane is present in excess. Upon reduction of the methane quantity in the sweep (0.9, 0.89 and 0.88 ml/min methane), both the oxygen and methane diminish after combustion, whereas the amount of $CO_2$ increases. This means that all produced oxygen by the BSCF membrane is consumed by the combustion reaction and there is no excess of unburned methane. A further reduction of methane (0.87 and 0.85 ml/min) in the sweep causes the amount of oxygen to rise, meaning the methane was not enough to consume all produced oxygen. In addition, the presence of small quantities of carbon monoxide indicates there is a slight occurrence of either an incomplete reaction or syngas reaction.

Figure 5:
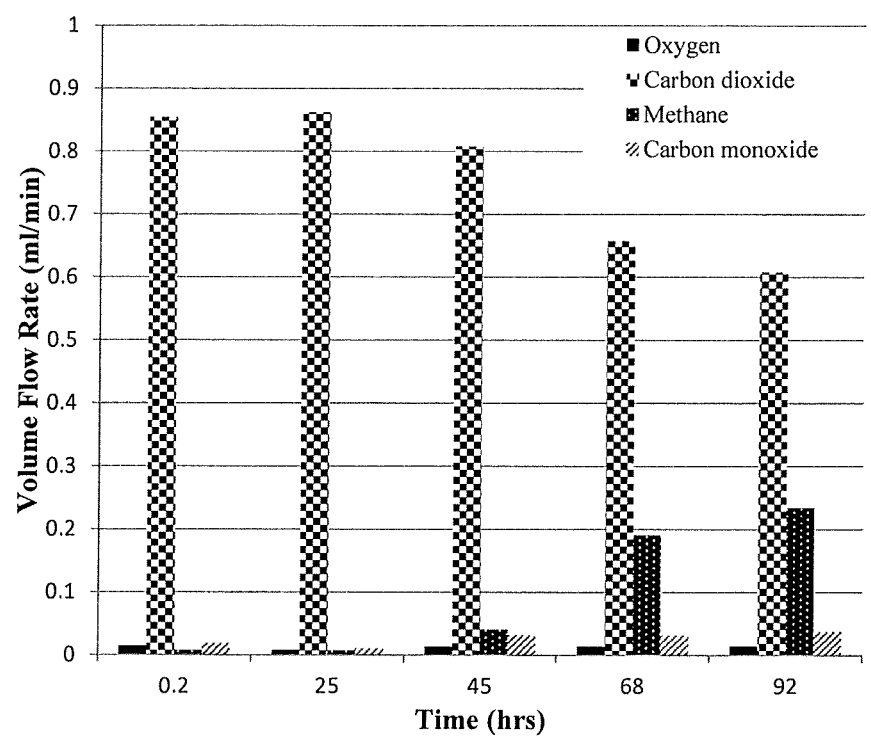
FIG. 5 represents a compositional analysis of gases detected in the sweep gas during a long-term combustion under a methane stream flow rate of 0.88 ml/min at 920° C.

Taking all of the above observations into account, a long-term study using 0.88 ml/min methane has been implemented. This flow rate would ensure nearly complete consumption of both oxygen and methane during the combustion and yield maximum amount of carbon dioxide. Furthermore, the trace of CO detected in the gas stream with this flow rate (FIG. 4) indicates that a close to complete combustion reaction is taking place. The membrane and setup used for this experiment is the same as the previous experiment i.e. 1.4 mm thick BSCF membrane operating at 920° C. FIG. 5 shows that the performance of the membrane deteriorates with the passage of time, evident by the decreasing amount of $CO_2$ and increasing methane. However, the rate of deterioration is much slower than what is claimed in the literature. According to FIG. 5, the BSCF membrane has operated under reactive condition for about 2 days without showing signs of deterioration. Even after 92 hours there is enough oxygen being supplied by the BSCF membrane to consume 0.61 ml/min methane. As expected, during the oxy-fuel combustion, the volume concentration of $CO_2$ in the sweep gas is consistently detected to be over 33%. The deterioration in the presence of such large percentage of $CO_2$ is only 30% after more than 90 hours continuous reaction. In the literature it is shown that even 20% concentration of $CO_2$ in the sweep gas reduces the membrane performance by 80% within 3 hours [S. Engels, T. Markus, M. Modigell, and L. Singheiser, "Oxygen permeation and stability investigations on MIEC membrane materials under operating conditions for power plant processes," *J. Memb. Sci.*, vol. 370, no. 1-2, pp. 58-69, March 2011; M. Schulz, R. Kriegel, and A. Kämpfer, "Assessment of $CO_2$ stability and oxygen flux of oxygen permeable membranes," *J. Memb. Sci.*, vol. 378, no. 1-2, pp. 10-17, August 2011].

Figure 6:
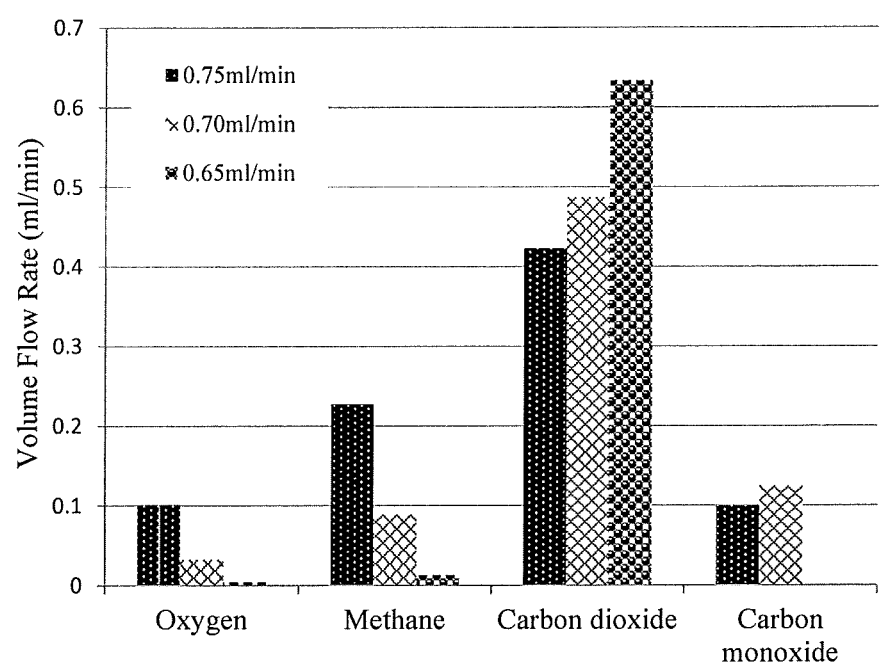
FIG. 6 represents a compositional analysis of gases detected in the sweep gas after 100 hours of combustion under a methane stream with different flow rates at 920° C.

After 100 hours of combustion at the methane flow rate of 0.88 ml/min, the fuel flow rate has been adjusted in order to determine the optimum fuel quantity needed for 100 hour operation. FIG. 6 shows that a fuel volume of 0.65 ml/min produces maximum $CO_2$ with nearly complete consumption of both oxygen and methane. In addition, CO gas has not been detected, which is another good indication of a close-to-perfect combustion reaction.

Example 6

Figure 7:
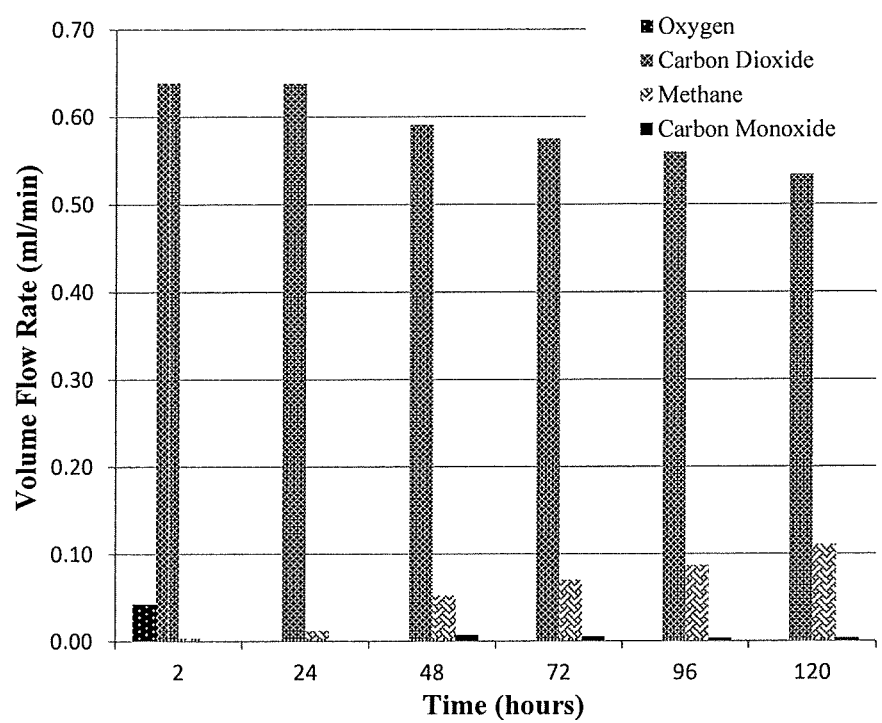
FIG. 7 represents a compositional analysis of gases detected during a long-term combustion reaction under a methane stream flow rate of 0.65 ml/min at 920° C., using a previously used BSCF membrane having a thickness of 1.4 mm.
Figure 8:
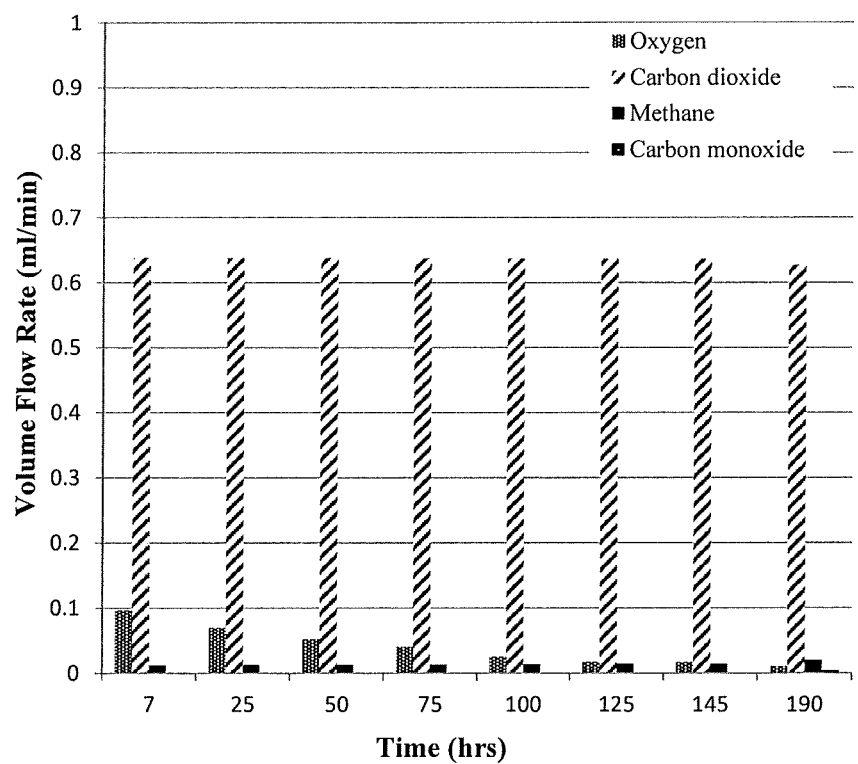
FIG. 8 represents a compositional analysis of gases detected during a long-term combustion reaction under a methane stream flow rate of 0.65 ml/min at 920° C., using a fresh BSCF membrane having a thickness of 1.4 mm.

The next test has been performed using the newly determined rate of fuel (0.65 ml/min) for the long term combustion reaction (FIG. 7). Initially the amount of methane is completely consumed and very little amount of oxygen is remained. However, for longer durations, the amount of $CH_4$ gradually increases and that of $CO_2$ decreases. It is worth noting that this membrane has already been subjected to previous tests, more than 150 operating hours. For this reason, a new identical membrane was prepared and tested with 0.65 ml/min $CH_4$ sweep in order to see the performance of a fresh membrane. The experimental test has run for in excess of 200 hours and the results are shown FIG. 8. According to the FIG. 8, it is evident that the BSCF membrane shows a good performance using 0.65 ml/min $CH_4$ for an extended period of time. Theoretically, if all methane is to be consumed, the membrane should produce a minimum oxygen flow of 1.3 ml/min. FIG. 8 shows that initially the membrane is producing excess of oxygen of 0.097 ml/min (7.5% excess). However, the excess-oxygen decreases with time and becomes negligible after 190 h of combustion. It can be predicted that if the test is kept running for a longer period of time the trend seen in FIG. 7 will be followed.

Figure 9:
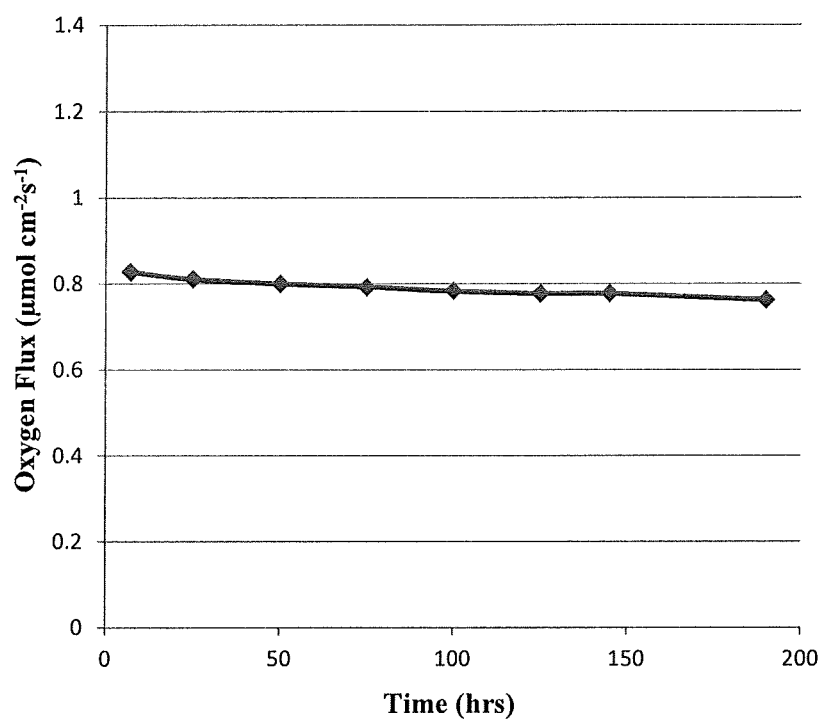
FIG. 9 represents an oxygen flux vs. time for a 1.4 mm thick BSCF membrane which is obtained based on a complete combustion of methane ($CH_4 + 2 O_2 \rightarrow CO_2 + 2 H_2O$).

FIG. 9 shows the oxygen permeability flux through the membrane during continuous oxy-fuel combustion reaction for nearly 200 hours. The initial flux value at the startup of the reactor is 0.827 µmol cm$^{-2}$ s$^{-1}$, and the flux value after 190 hours is 0.762 µmol cm$^{-2}$ s$^{-1}$. This is a decrease of only 7.9% under a continuous oxy-fuel combustion reaction at the membrane's surface for more than a week of operation.

Figure 10:
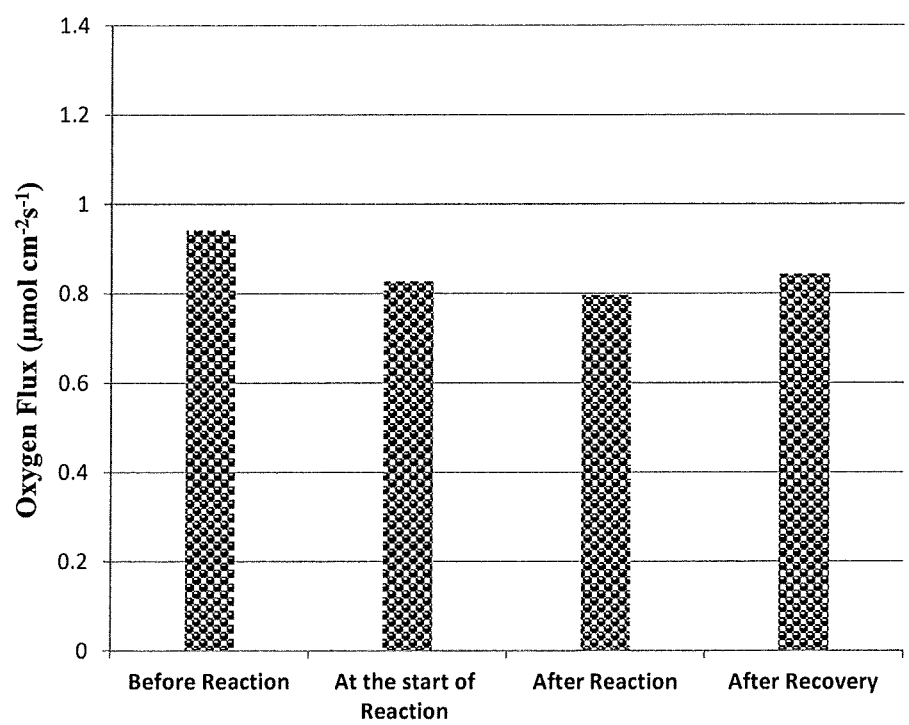
FIG. 10 represents an effect of combustion reactions on oxygen flux at 920° C. using 1.4 mm thick BSCF membrane and a methane stream flow rate of 0.65 ml/min. Helium was used as a sweep gas stream with a flow rate of 30 ml/min before and after combustion reactions. The recovery is set for 12 h under air flow on both sides of the membrane.

FIG. 10 shows that the oxygen permeability of the BSCF membranes decreases 11.7% from a value of 0.94 µmol cm$^{-2}$ s$^{-1}$ during inert operation to a value of 0.83 µmol cm$^{-2}$ s$^{-1}$ at the beginning of the combustion reaction. This drop in permeability flux is due to the effect of differences in partial pressure at the permeate side. Apparently, the helium gas flow rate, 30 ml/min, generates higher partial pressure difference than that when using methane at 0.65 ml/min. As a matter of fact, right after the first measurement of the permeability flux under combustion reaction, the system was switched back to inert gas process (30 ml/min of helium), and the flux was measured to be the same as the first measured flux of 0.94 µmol cm$^{-2}$ s$^{-1}$. Therefore, the membrane did not show any deterioration at the early stage of oxy-fuel combustion. However, after 190 hours of continuous oxy-fuel combustion reaction, the permeability of the membrane was measured again under helium gas flow rate of 30 ml/min, and the permeability flux was found to be 0.80 µmol·cm$^{-2}$·s$^{-1}$. Compared to the initial value of 0.94 µmol cm$^{-2}$ s$^{-1}$ before the start of combustion, there is a 15% loss. In order to refresh the membrane it was kept under air flow on both feed and permeate sides for 12 hours at 920° C. The oxygen permeability flux was measured after this recovery and found to be 0.84 µmol cm$^{-2}$ s$^{-1}$. This indicates that the membrane has endured a permanent damage of about 10%. It is worth noting that initially, under methane combustion, the membrane was producing 0.097 ml/min excess of oxygen (FIG. 8). After 190 h of combustion, the excess of oxygen has dropped to 0.010 ml/min.

Example 7

Figure 11:
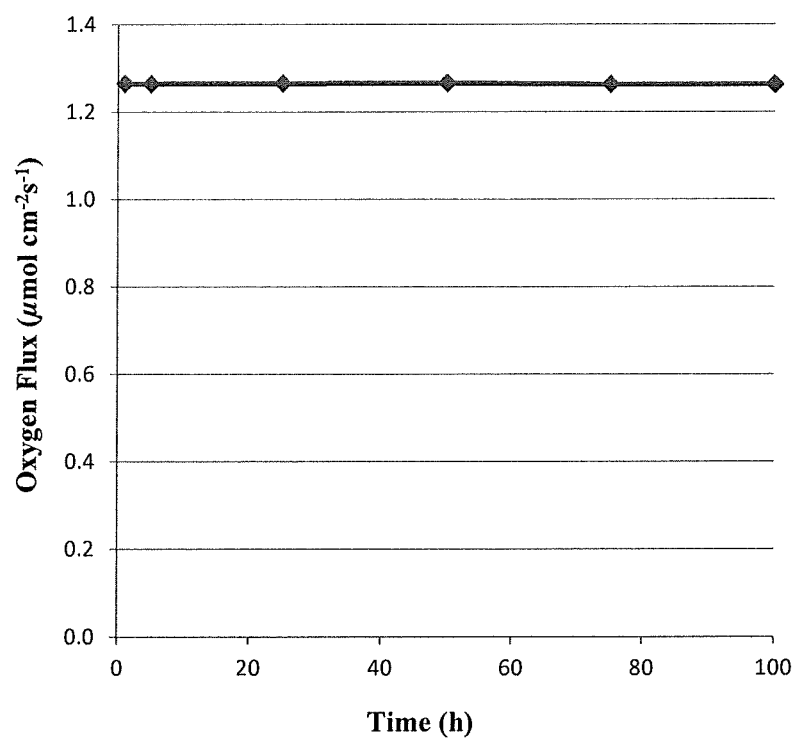
FIG. 11 represents an oxygen flux vs. time for a 1.0 mm thick BSCF membrane over a period of 1,000 hours at 920° C. Helium is used as a sweep gas at a flow rate of 30 ml/min.
Figure 12:
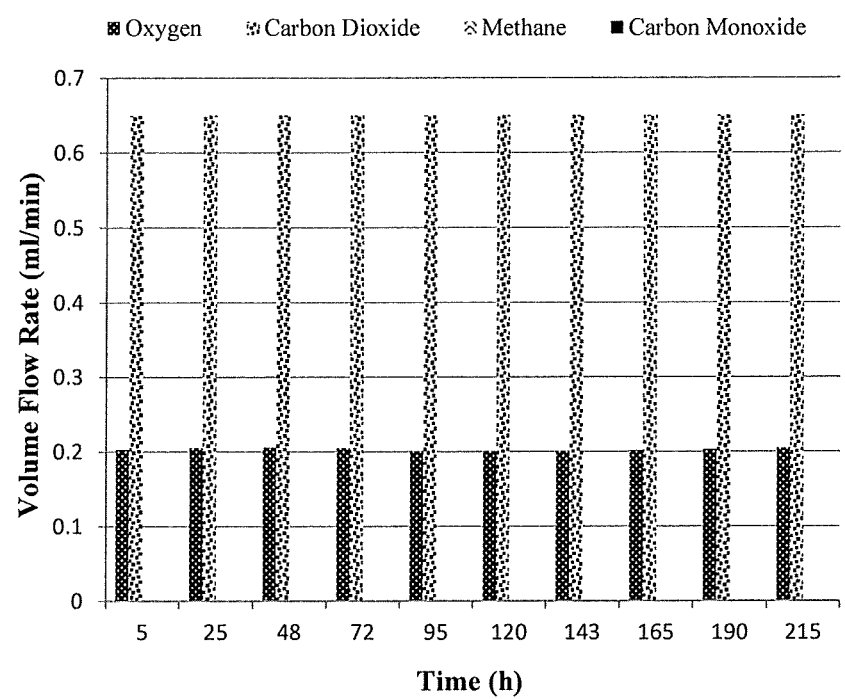
FIG. 12 represents a compositional analysis of gases detected during a long-term combustion reaction under a methane stream flow rate of 0.65 ml/min at 920° C., using a BSCF membrane having a thickness of 1.0 mm.

Up till this point, BSCF membranes of 1.4 mm thickness were used to investigate the permeability and chemical stability. It is understood that a decrease in the thickness of the BSCF membrane would enhance the oxygen flux. This holds true until the membrane reaches a critical thickness value (L$_c$) after which surface kinetics of the membrane start to limit the permeability of oxygen. A further decrease in the thickness doesn't appreciably increase the oxygen flux. Hong and Choi [W. K. Hong and G. M. Choi, "Oxygen permeation of BSCF membrane with varying thickness and surface coating," *J. Memb. Sci.*, vol. 346, no. 2, pp. 353-360, January 2010] determined L$_c$ of BSCF membranes operating at a temperature of 900° C. to be 1.1 mm. Considering this, a membrane of 1.0 mm thickness was produced and tested in identical conditions as before. This membrane was found to have a constant oxygen permeability of 1.26 µmol cm$^{-2}$ s$^{-1}$ for a period of 100 hours when tested with 30 ml/min helium as sweep (FIG. 11) at 920° C. The helium sweep-gas was then replaced with 0.65 ml/min methane gas in order to determine the stability and permeability of this membrane when subjected to combustion reaction. FIG. 12 showed that, in this case, all of the methane gas reacted with oxygen to convert to carbon dioxide and water in a complete combustion reaction. In addition, there was excess oxygen of 0.20 ml/min (15% excess), measured from the sweep side. No traces of methane or carbon monoxide were detected. The experiment was kept running for more than 200 hours while taking regular readings. Even after 200 hours the amount of excess oxygen remains 0.20 ml/min with no decrease in the amount of carbon dioxide. This is a remarkable result which showed that a carefully controlled fuel volume introduced into a BSCF OTM reactor provided high oxygen output and excellent stability for long period of time.

Figure 13:
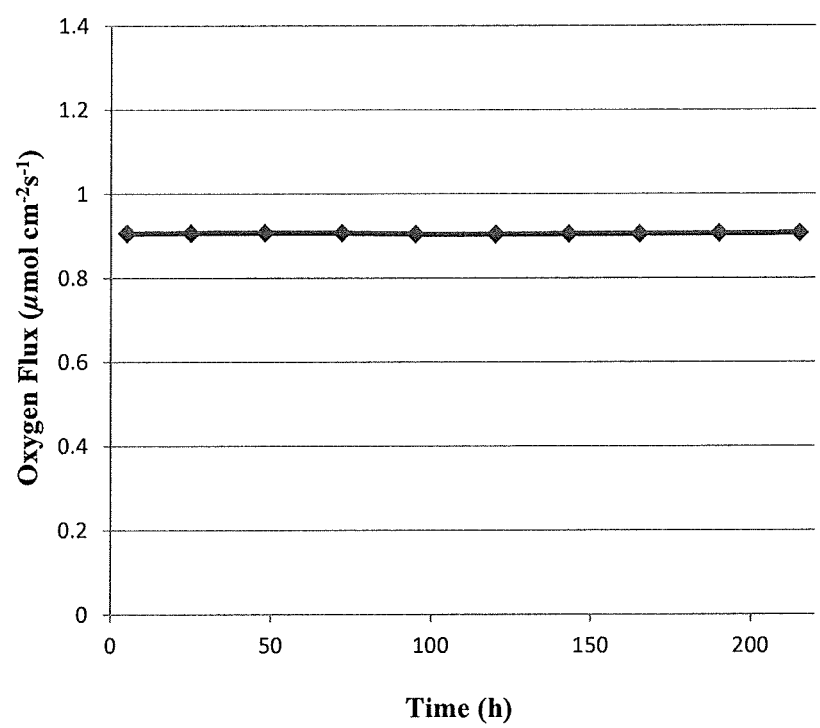
FIG. 13 represents an oxygen flux vs. time for a 1.0 mm thick BSCF membrane which is obtained based on a complete combustion of methane ($CH_4 + 2 O_2 \rightarrow CO_2 + 2 H_2O$).
Figure 14:
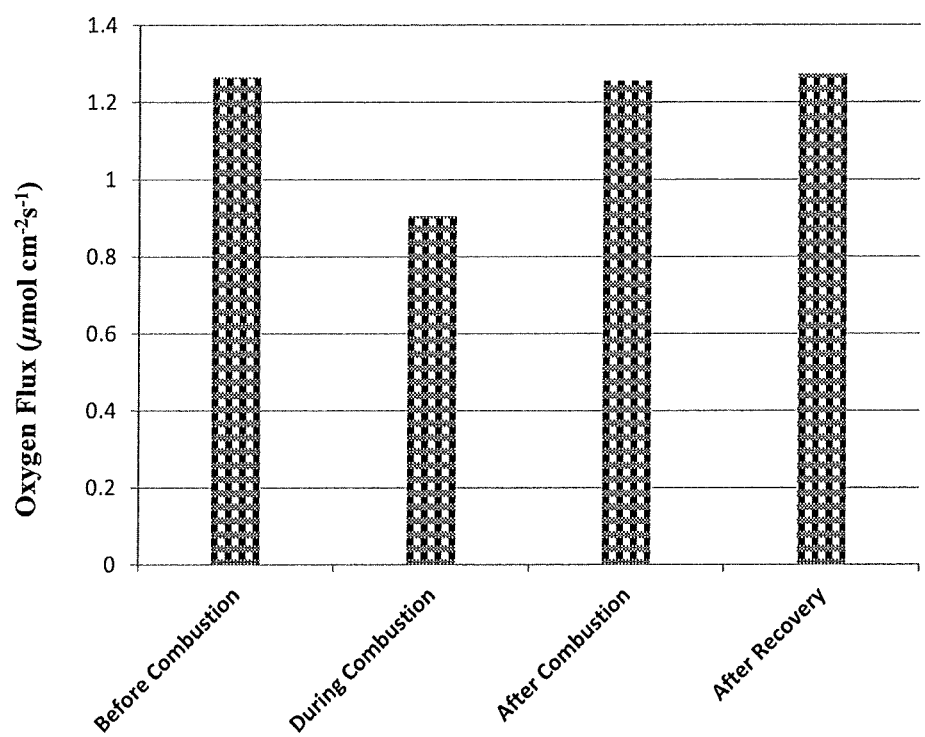
FIG. 14 represents an effect of combustion reactions on oxygen flux at 920° C. using 1.0 mm thick BSCF membrane and a methane stream flow rate of 0.65 ml/min. Helium was used as a sweep gas stream with a flow rate of 30 ml/min before and after combustion reactions. The recovery is set for 12 h under air flow on both sides of the membrane.

FIG. 13 shows that the permeability of oxygen during the combustion reaction is constant at about 0.91 µmol cm$^{-2}$ s$^{-1}$ for the whole duration of the experiment. Once the combustion has ended the permeability of the membrane is analyzed using 30 ml/min helium as sweep (FIG. 14). The membrane immediately returns a permeability of 1.25 µmol cm$^{-2}$ s$^{-1}$ which is the same value as that before combustion. This further confirms that there is no temporary or permanent damage to the membrane as a result of the combustion reaction with methane.

$Ba_{0.5}Sr_{0.5}Co_{0.8}Fe_{0.2}O_{3-\delta}$ powders were prepared by modified Pechini method. Membranes were prepared using uniaxial compaction and sintering. These membranes were used to separate oxygen from air in an OTM reactor. The BSCF membrane showed excellent stability with respect to time producing a constant oxygen flux for an operation of 1000 hours when Helium was being used as the sweep gas. The sweep gas was switched to methane in order to evaluate the performance of 1.4 mm thick BSCF membranes during oxy-fuel combustion. The quantity of methane used was carefully adjusted so that all of oxygen produced by the membrane is utilized without leaving any excess of methane in the sweep. A methane quantity of 0.65 ml/min was found to be appropriate for running the experiment in excess of 200 hours. The quantities of carbon dioxide produced as a result of the reaction and any excess of oxygen or methane were measured. It was shown that with such optimized combustion taking place, the degradation of BSCF membranes was much slower than expected. During an operation of nearly 200 hours the quantity of oxygen produced by the membrane reduced only by 7.9%. A 1.0 mm thick BSCF membrane tested under identical conditions was found to produce 1.26 µmol cm$^{-2}$ s$^{-1}$ and 0.91 µmol cm$^{-2}$ s$^{-1}$ oxygen under 30 ml/min He and 0.65 ml/min methane sweep, respectively. During combustion reaction, this membrane was found to be consuming all of the methane provided into carbon dioxide, in addition to an excess oxygen of 0.20 ml/min (15% excess oxygen). Both levels of oxygen and carbon dioxide were found to be constant for an operation of above 200 hours indicating excellent stability. After finishing the combustion, a return to helium gas as sweep produced 1.25 µmol cm$^{-2}$ s$^{-1}$ oxygen, further providing evidence of stable membrane operation under combustion reaction.

The invention claimed is:

1. A method of combusting a methane stream with an oxygen transport membrane assembly comprising
a vessel with an internal cavity having a feed side and a combustion side that are separated by an oxygen transport membrane having a composition with a general formula $A_xA'_{x'}B_yB'_{y'}O_{3-z}$,
wherein each of A and A' is selected from the group consisting of Sr, Ba, La, and Ca, and each of B and B' is selected from the group consisting of Fe, Co, Cr, and Ga, and wherein each of x, x', y, and y' has a value between 0 and 1, such that x+x'=1 and y+y'=1, and z is a number that varies to maintain electro-neutrality of the oxygen transport membrane, the method comprising:

delivering an oxygen-containing stream to the feed side of the vessel, wherein molecular oxygen present in the oxygen-containing stream is transported to the combustion side through the oxygen transport membrane; and delivering a methane stream to the combustion side of the vessel, wherein methane in the methane stream is combusted with the molecular oxygen to form an exhaust stream that comprises water vapor, carbon dioxide, and molecular oxygen, wherein a molar flow rate ratio of methane to the molecular oxygen is in the range of 1:2.1 to 1:3 to provide greater than 7.5 vol % and up to 15 vol % molecular oxygen in the exhaust stream.

2. The method of claim 1, wherein a volumetric flow rate of the methane stream is less than 20 L/min per 1.0 m² surface area of the oxygen transport membrane.

3. The method of claim 1, wherein a thickness of the oxygen transport membrane is in the range of 0.5-3 mm.

4. The method of claim 1, wherein an oxygen flux of the oxygen transport membrane is in the range of 0.5-2.5 $\mu mol \cdot cm^{-2} \cdot s^{-1}$ at a temperature in the range of 600-1,200° C.

5. The method of claim 1, wherein the oxygen transport membrane is $Ba_{0.5}Sr_{0.5}Co_{0.5}Fe_{0.2}O_{3-z}$.

6. The method of claim 5, wherein a volumetric flow rate of the methane stream is less than 10 L/min per 1.0 m² surface area of the oxygen transport membrane.

7. The method of claim 1, wherein a thickness of the oxygen transport membrane is in the range of 1-1.5 mm, and an oxygen flux of the oxygen transport membrane is within the range of 0.8-1.5 $\mu mol \cdot cm^{-2} \cdot s^{-1}$ at a temperature in the range of 800-1,100° C.

8. The method of claim 1, wherein a thickness of the oxygen transport membrane is in the range of 1-1.5 mm, and an oxygen flux of the oxygen transport membrane is within the range of 0.8-1.5 $\mu mol \cdot cm^{-2} \cdot s^{-1}$ at a temperature in the range of 800-1,100° C. for at least 200 hours.

9. The method of claim 1, wherein no more than 0.1 vol % of carbon dioxide, nitrogen, hydrogen, water vapor, carbon monoxide, argon, helium, and/or ethane are present in the methane stream.

10. The method of claim 1, further comprising:

cooling the exhaust stream to form a liquid phase comprising water and a gaseous phase comprising carbon dioxide;

separating the liquid phase from the gaseous phase; and injecting the gaseous phase into a geological formation.

11. The method of claim 1, further comprising:

cooling the exhaust stream to form a liquid phase comprising water and a gaseous phase comprising carbon dioxide and no more than 1.0 vol % of nitrogen, hydrogen, carbon monoxide, argon, helium, methane, and/or ethane;

separating the liquid phase from the gaseous phase; and injecting the gaseous phase into a geological formation.

12. The method of claim 1, wherein the oxygen transport membrane is $Ba_{0.5}Sr_{0.5}Co_{0.5}Fe_{0.2}O_{3-z}$ doped with at least one element selected from the group consisting of Ni, Ti, Zr, Ga, Ce, Ca, Mn, Nb, and Bi.

13. The method of claim 1, wherein the oxygen transport membrane is $Ba_{0.5}Sr_{0.5}Co_{0.5}Fe_{0.2}O_{3-z}$ coated with a coating layer having a composition of $RBaCO_2O_{5+\delta}$, wherein R is at least one element selected from the group consisting of Pr, Nd, Sm, and Gd, and δ varies to maintain electro-neutrality.

14. The method of claim 1, wherein the oxygen transport membrane is $Ba_{0.5}Sr_{0.5}Co_{0.5}Fe_{0.2}O_{3-z}$, which contains pores having a size of 0.5 to 3 nm.

* * * * *